US012627400B2

(12) United States Patent
Li et al.

(10) Patent No.: US 12,627,400 B2
(45) Date of Patent: May 12, 2026

(54) SIZE-BASED NEURAL NETWORK SELECTION FOR AUTOENCODER-BASED COMMUNICATION

(71) Applicant: QUALCOMM Incorporated, San Diego, CA (US)

(72) Inventors: Qiaoyu Li, Beijing (CN); Yu Zhang, San Diego, CA (US); Hao Xu, Beijing (CN); Chao Wei, Beijing (CN); Liangming Wu, Beijing (CN); Rui Hu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 18/006,853

(22) PCT Filed: Sep. 11, 2020

(86) PCT No.: PCT/CN2020/114677
§ 371 (c)(1),
(2) Date: Jan. 25, 2023

(87) PCT Pub. No.: WO2022/052022
PCT Pub. Date: Mar. 17, 2022

(65) Prior Publication Data
US 2023/0353277 A1 Nov. 2, 2023

(51) Int. Cl.
*H04W 72/12* (2023.01)
*H04L 1/00* (2006.01)

(52) U.S. Cl.
CPC .......... *H04L 1/0041* (2013.01); *H04L 1/0045* (2013.01); *H04W 72/12* (2013.01)

(58) Field of Classification Search
CPC .... H04L 1/0041; H04L 1/0045; H04W 72/12; G06N 3/0455; G06N 3/08
See application file for complete search history.

(56) References Cited

U.S. PATENT DOCUMENTS

2014/0358526 A1 12/2014 Abdelal et al.
2019/0385063 A1 12/2019 Yu et al.
(Continued)

FOREIGN PATENT DOCUMENTS

CN 109996084 A 7/2019
CN 111565061 A 8/2020
(Continued)

OTHER PUBLICATIONS

Supplementary European Search Report—EP20952810—Search Authority—Munich—Apr. 25, 2024.
(Continued)

*Primary Examiner* — Natasha W Cosme
*Assistant Examiner* — Benjamin T. Ranew
(74) *Attorney, Agent, or Firm* — Holland & Hart LLP

(57) ABSTRACT

Methods, systems, and devices for wireless communications are described. In some wireless communications systems, devices may implement multiple autoencoders for communications. A wireless device may select an autoencoder to use for communications based on a size parameter for a message. For example, a user equipment (UE) may receive a grant from a base station indicating a size parameter for communicating a message. The UE and base station may determine, from a set of neural network (NN)-based encoders configured at the UE, an NN-based encoder corresponding to the size parameter. The UE may communicate the message with the base station according to the grant and based on the determined NN-encoder. In some examples, the UE and base station may determine a number of resource segments from a set of resources allocated for communication and may determine respective NN-based encoders for the different resource segments.

29 Claims, 19 Drawing Sheets

(56)             References Cited

U.S. PATENT DOCUMENTS

2020/0279105 A1     9/2020  Muffat et al.
2022/0052887 A1*    2/2022  Levitsky ............. H04L 25/4917

FOREIGN PATENT DOCUMENTS

KR          20200075709 A     6/2020
WO      WO-2020035684 A1 *   2/2020   ........ H03M 13/6312

OTHER PUBLICATIONS

International Search Report and Written Opinion—PCT/CN2020/114677—ISA/EPO—Jun. 9, 2021.
Samsung, et al., "Model Transfer Split Computation Decision Factors", 3GPP TSG-SA WG1 Meeting #91e, S1-203316, Electronic Meeting, Aug. 24, 2020-Aug. 28, 2020, 3 Pages, Aug. 28, 2020 (Aug. 28, 2020) the whole document.

* cited by examiner

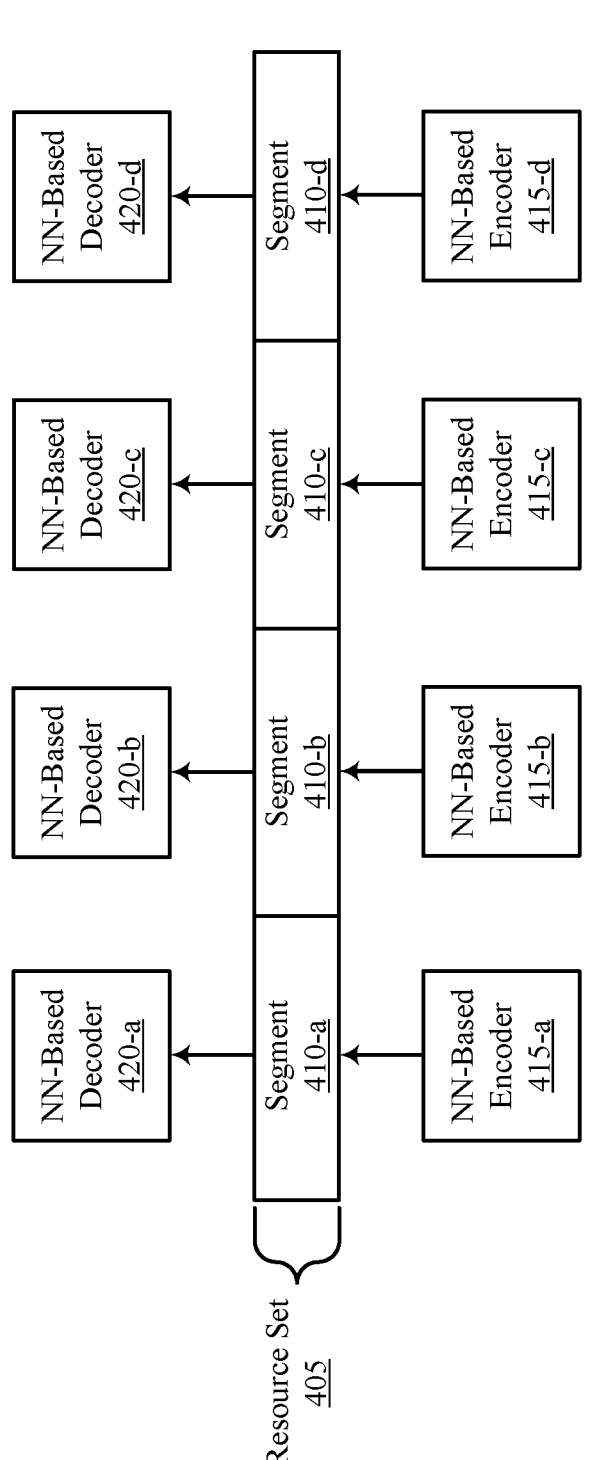
FIG. 4

Receive, from a base station, a grant indicating a size parameter for communicating a message

1505

Determine, from a set of multiple NN-based encoders configured at the UE, an NN-based encoder corresponding to the size parameter

1510

Communicate the message with the base station according to the grant and based on the determined NN-based encoder

1515

1500

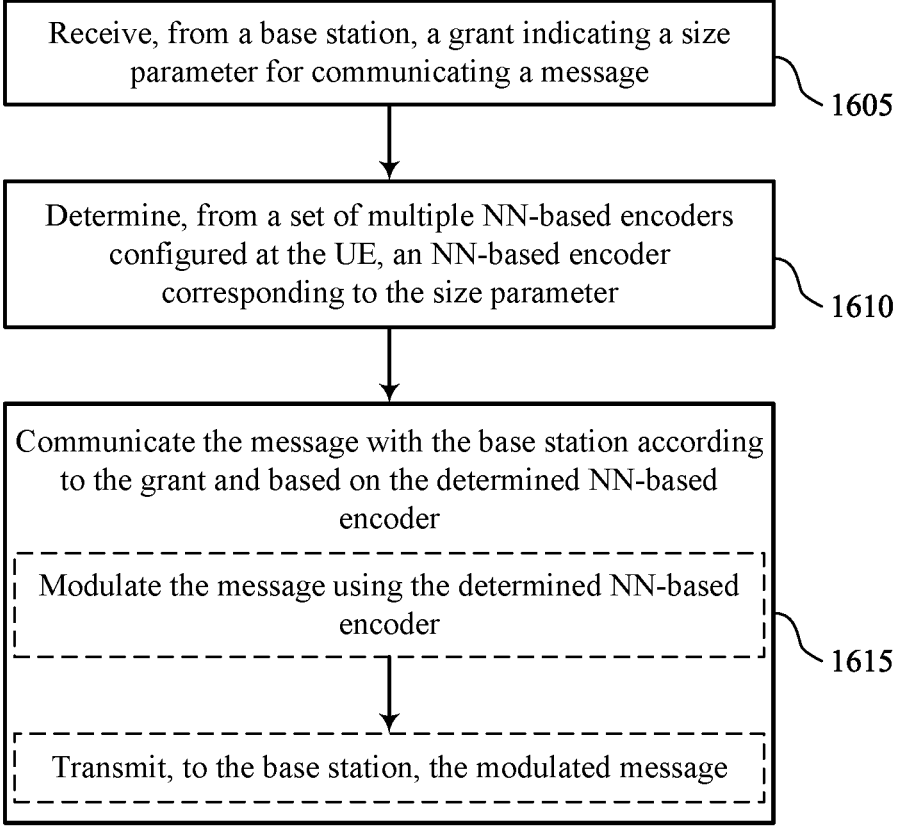

Receive, from a base station, a grant indicating a size parameter for communicating a message

1605

Determine, from a set of multiple NN-based encoders configured at the UE, an NN-based encoder corresponding to the size parameter

1610

Communicate the message with the base station according to the grant and based on the determined NN-based encoder Modulate the message using the determined NN-based encoder

1615

Transmit, to the base station, the modulated message

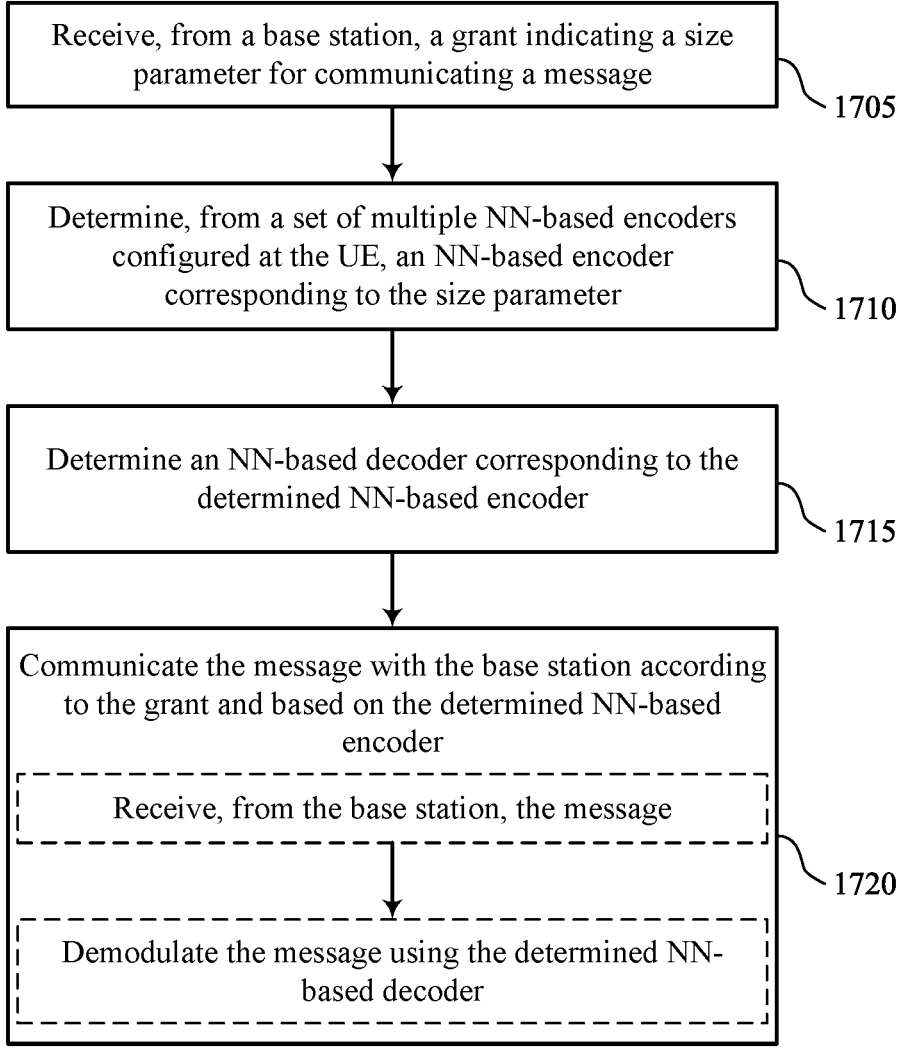

Receive, from a base station, a grant indicating a size parameter for communicating a message
1705

Determine, from a set of multiple NN-based encoders configured at the UE, an NN-based encoder corresponding to the size parameter
1710

Determine an NN-based decoder corresponding to the determined NN-based encoder
1715

Communicate the message with the base station according to the grant and based on the determined NN-based encoder Receive, from the base station, the message Demodulate the message using the determined NN-based decoder
1720

Transmit, to a UE, a grant indicating a size parameter for communicating a message

1805

Determine, from a set of multiple NN-based encoders configured for the UE, an NN-based encoder corresponding to the size parameter

1810

Communicate the message with the UE according to the grant and based on the determined NN-based encoder

1815

1800

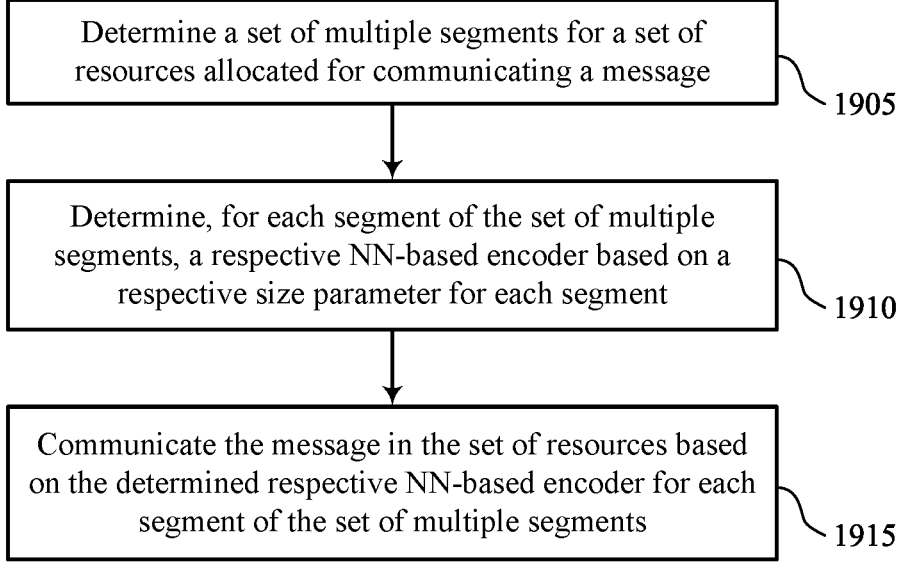

Determine a set of multiple segments for a set of resources allocated for communicating a message

1905

Determine, for each segment of the set of multiple segments, a respective NN-based encoder based on a respective size parameter for each segment

1910

Communicate the message in the set of resources based on the determined respective NN-based encoder for each segment of the set of multiple segments

SIZE-BASED NEURAL NETWORK SELECTION FOR AUTOENCODER-BASED COMMUNICATION

CROSS REFERENCE

The present application is a 371 national stage filing of International PCT Application No. PCT/CN2020/114677 by LI et al. entitled "SIZE-BASED NEURAL NETWORK SELECTION FOR AUTOENCODER-BASED COMMUNICATION," filed Sep. 11, 2020, which is assigned to the assignee hereof, and which is expressly incorporated by reference in its entirety herein.

FIELD OF TECHNOLOGY

The following relates to wireless communications, including size-based neural network (NN) selection for autoencoder-based communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device (e.g., a UE or a base station) may utilize an autoencoder for encoding transmissions, decoding transmissions, or both. However, an autoencoder may be optimized or otherwise trained based on a specific message size for communication and may perform relatively poorly for other message sizes. As such, a wireless device implementing an autoencoder may experience inefficient modulation techniques, large signaling overhead, or both depending on the size of a communicated message. Furthermore, in cases where a message is communicated in a non-coherent transmission, channel estimation may be unavailable to help with demodulation of the message, resulting in potentially unreliable demodulation using an autoencoder.

SUMMARY

The described techniques relate to improved methods, systems, devices, and apparatuses that support size-based neural network (NN) selection for autoencoder-based communication. Generally, the described techniques provide for a user equipment (UE) and a base station to implement autoencoder-based communications by selecting a specific NN to use for communicating a message from a set of multiple configured NNs based on a size parameter for the message. In some cases, the message may be communicated in a non-coherent transmission (e.g., a transmission lacking reference signals, such as demodulation reference signals (DMRSs), for channel estimation). The UE may be configured or preconfigured with the set of NN-based encoders. The UE may receive, from the base station, a grant indicating the size parameter (e.g., a transport block (TB) size or another size parameter) for communicating a message. Based on the size parameter, the UE and base station may each determine an NN-based encoder (i.e., the same NN-based encoder from the configured set of NN-based encoders). In some cases, multiple NN-based encoders may be associated with a single size parameter. In some such cases, the base station may explicitly indicate one NN-based encoder using an NN-based encoder index included in the grant. In some other such cases, the UE and base station may implicitly determine one NN-based encoder based on one or more transmission parameters.

The UE and base station may communicate the message according to the grant and based on the determined NN-based encoder. For example, one wireless device may encode the message for transmission using the NN-based encoder, and the other wireless device may determine an NN-based decoder for decoding the message. In some cases, the NN-based decoder may correspond to the determined NN-based encoder. In some other cases, the NN-based decoder may be determined based on an NN-based decoder index indicated by the grant. In some examples, separate NN-based encoders and/or decoders may be determined for different segments of allocated resources. For example, a wireless device (e.g., a UE or a base station) may determine the different segments of allocated resources based on a respective size parameter of the segments.

A method for wireless communications at a UE is described. The method may include receiving, from a base station, a grant indicating a size parameter for communicating a message, determining, from a set of NN-based encoders configured at the UE, an NN-based encoder corresponding to the size parameter, and communicating the message with the base station according to the grant and based on the determined NN-based encoder.

An apparatus for wireless communications at a UE is described. The apparatus may include a processor, memory coupled with the processor, and instructions stored in the memory. The instructions may be executable by the processor to cause the apparatus to receive, from a base station, a grant indicating a size parameter for communicating a message, determine, from a set of NN-based encoders configured at the UE, an NN-based encoder corresponding to the size parameter, and communicate the message with the base station according to the grant and based on the determined NN-based encoder.

Another apparatus for wireless communications at a UE is described. The apparatus may include means for receiving, from a base station, a grant indicating a size parameter for communicating a message, determining, from a set of NN-based encoders configured at the UE, an NN-based encoder corresponding to the size parameter, and communicating the message with the base station according to the grant and based on the determined NN-based encoder.

A non-transitory computer-readable medium storing code for wireless communications at a UE is described. The code may include instructions executable by a processor to receive, from a base station, a grant indicating a size parameter for communicating a message, determine, from a set of NN-based encoders configured at the UE, an NN-based encoder corresponding to the size parameter, and communicate the message with the base station according to the grant and based on the determined NN-based encoder.

In some examples of the method, apparatuses, and non-transitory computer-readable medium described herein, the communicating may include operations, features, means, or instructions for communicating the message in a non-coherent transmission, the non-coherent transmission including the message and no reference signals associated with the message for channel estimation.

In some examples of the method, apparatuses, and non-transitory computer-readable medium described herein, the determining may include operations, features, means, or instructions for determining a subset of the set of NN-based encoders corresponding to the size parameter and determining the NN-based encoder from the subset of the set of NN-based encoders based on an NN-based encoder index indicated by the grant.

In some examples of the method, apparatuses, and non-transitory computer-readable medium described herein, the determining may include operations, features, means, or instructions for determining a subset of the set of NN-based encoders corresponding to the size parameter and determining the NN-based encoder from the subset of the set of NN-based encoders based on a transmission parameter.

In some examples of the method, apparatuses, and non-transitory computer-readable medium described herein, the transmission parameter includes a bandwidth indicator, a modulation scheme, a channel coding rate, or a combination thereof.

Some examples of the method, apparatuses, and non-transitory computer-readable medium described herein may further include operations, features, means, or instructions for receiving, from the base station, a configuration message indicating the set of NN-based encoders and one or more size parameters corresponding to each NN-based encoder of the set of NN-based encoders.

In some examples of the method, apparatuses, and non-transitory computer-readable medium described herein, the UE may be pre-configured with the set of NN-based encoders and one or more size parameters corresponding to each NN-based encoder of the set of NN-based encoders.

In some examples of the method, apparatuses, and non-transitory computer-readable medium described herein, the size parameter corresponds to a transport block (TB) size for the message, a number of resource elements (REs) for transmitting the message, a number of physical resource blocks (PRBs) for transmitting the message, a number of orthogonal frequency domain multiplexing (OFDM) symbols for transmitting the message, a number of coded bits for transmitting the message, or a combination thereof.

In some examples of the method, apparatuses, and non-transitory computer-readable medium described herein, the communicating may include operations, features, means, or instructions for modulating the message using the determined NN-based encoder and transmitting, to the base station, the modulated message.

Some examples of the method, apparatuses, and non-transitory computer-readable medium described herein may further include operations, features, means, or instructions for determining an NN-based decoder corresponding to the determined NN-based encoder. In some examples of the method, apparatuses, and non-transitory computer-readable medium described herein, the communicating may include operations, features, means, or instructions for receiving, from the base station, the message and demodulating the message using the determined NN-based decoder.

In some examples of the method, apparatuses, and non-transitory computer-readable medium described herein, the NN-based decoder may be determined based on an NN-based decoder index indicated by the grant.

In some examples of the method, apparatuses, and non-transitory computer-readable medium described herein, the grant includes a dynamic uplink grant, a configured grant, a dynamic downlink grant, a semi-persistent scheduling (SPS) configuration, or a combination thereof.

A method for wireless communications at a base station is described. The method may include transmitting, to a UE, a grant indicating a size parameter for communicating a message, determining, from a set of NN-based encoders configured for the UE, an NN-based encoder corresponding to the size parameter, and communicating the message with the UE according to the grant and based on the determined NN-based encoder.

An apparatus for wireless communications at a base station is described. The apparatus may include a processor, memory coupled with the processor, and instructions stored in the memory. The instructions may be executable by the processor to cause the apparatus to transmit, to a UE, a grant indicating a size parameter for communicating a message, determine, from a set of NN-based encoders configured for the UE, an NN-based encoder corresponding to the size parameter, and communicate the message with the UE according to the grant and based on the determined NN-based encoder.

Another apparatus for wireless communications at a base station is described. The apparatus may include means for transmitting, to a UE, a grant indicating a size parameter for communicating a message, determining, from a set of NN-based encoders configured for the UE, an NN-based encoder corresponding to the size parameter, and communicating the message with the UE according to the grant and based on the determined NN-based encoder.

A non-transitory computer-readable medium storing code for wireless communications at a base station is described. The code may include instructions executable by a processor to transmit, to a UE, a grant indicating a size parameter for communicating a message, determine, from a set of NN-based encoders configured for the UE, an NN-based encoder corresponding to the size parameter, and communicate the message with the UE according to the grant and based on the determined NN-based encoder.

In some examples of the method, apparatuses, and non-transitory computer-readable medium described herein, the communicating may include operations, features, means, or instructions for communicating the message in a non-coherent transmission, the non-coherent transmission including the message and no reference signals associated with the message for channel estimation.

In some examples of the method, apparatuses, and non-transitory computer-readable medium described herein, the determining may include operations, features, means, or instructions for determining a subset of the set of NN-based encoders corresponding to the size parameter and determining the NN-based encoder from the subset of the set of NN-based encoders based on an NN-based encoder index indicated by the grant.

In some examples of the method, apparatuses, and non-transitory computer-readable medium described herein, the determining may include operations, features, means, or instructions for determining a subset of the set of NN-based encoders corresponding to the size parameter and determining the NN-based encoder from the subset of the set of NN-based encoders based on a transmission parameter.

In some examples of the method, apparatuses, and non-transitory computer-readable medium described herein, the transmission parameter includes a bandwidth indicator, a modulation scheme, a channel coding rate, or a combination thereof.

Some examples of the method, apparatuses, and non-transitory computer-readable medium described herein may further include operations, features, means, or instructions for transmitting, to the UE, a configuration message indicating the set of NN-based encoders and one or more size parameters corresponding to each NN-based encoder of the set of NN-based encoders.

In some examples of the method, apparatuses, and non-transitory computer-readable medium described herein, the size parameter corresponds to a TB size for the message, a number of REs for transmitting the message, a number of PRBs for transmitting the message, a number of OFDM symbols for transmitting the message, a number of coded bits for transmitting the message, or a combination thereof.

In some examples of the method, apparatuses, and non-transitory computer-readable medium described herein, the communicating may include operations, features, means, or instructions for modulating the message using the determined NN-based encoder and transmitting, to the UE, the modulated message.

Some examples of the method, apparatuses, and non-transitory computer-readable medium described herein may further include operations, features, means, or instructions for determining an NN-based decoder corresponding to the determined NN-based encoder. In some examples of the method, apparatuses, and non-transitory computer-readable medium described herein, the communicating may include operations, features, means, or instructions for receiving, from the UE, the message and demodulating the message using the determined NN-based decoder.

In some examples of the method, apparatuses, and non-transitory computer-readable medium described herein, the grant includes a dynamic uplink grant, a configured grant, a dynamic downlink grant, an SPS configuration, or a combination thereof.

A method for wireless communications is described. The method may include determining a set of segments for a set of resources allocated for communicating a message, determining, for each segment of the set of segments, a respective NN-based encoder based on a respective size parameter for each segment, and communicating the message in the set of resources based on the determined respective NN-based encoder for each segment of the set of segments.

An apparatus for wireless communications is described. The apparatus may include a processor, memory coupled with the processor, and instructions stored in the memory. The instructions may be executable by the processor to cause the apparatus to determine a set of segments for a set of resources allocated for communicating a message, determine, for each segment of the set of segments, a respective NN-based encoder based on a respective size parameter for each segment, and communicate the message in the set of resources based on the determined respective NN-based encoder for each segment of the set of segments.

Another apparatus for wireless communications is described. The apparatus may include means for determining a set of segments for a set of resources allocated for communicating a message, determining, for each segment of the set of segments, a respective NN-based encoder based on a respective size parameter for each segment, and communicating the message in the set of resources based on the determined respective NN-based encoder for each segment of the set of segments.

A non-transitory computer-readable medium storing code for wireless communications is described. The code may include instructions executable by a processor to determine a set of segments for a set of resources allocated for communicating a message, determine, for each segment of the set of segments, a respective NN-based encoder based on a respective size parameter for each segment, and communicate the message in the set of resources based on the determined respective NN-based encoder for each segment of the set of segments.

Some examples of the method, apparatuses, and non-transitory computer-readable medium described herein may further include operations, features, means, or instructions for determining that a TB size for the message satisfies a threshold size, where the set of segments may be determined based on the TB size for the message satisfying the threshold size.

In some examples of the method, apparatuses, and non-transitory computer-readable medium described herein, the communicating may include operations, features, means, or instructions for modulating the message in each segment of the set of segments using the determined respective NN-based encoder for each segment of the set of segments and transmitting the modulated message.

Some examples of the method, apparatuses, and non-transitory computer-readable medium described herein may further include operations, features, means, or instructions for determining, for each segment of the set of segments, a respective NN-based decoder corresponding to the determined respective NN-based encoder for each segment of the set of segments. In some examples of the method, apparatuses, and non-transitory computer-readable medium described herein, the communicating may include operations, features, means, or instructions for receiving the message and demodulating the message in each segment of the set of segments using the determined respective NN-based decoder for each segment of the set of segments.

In some examples of the method, apparatuses, and non-transitory computer-readable medium described herein, the set of segments may be determined based on one or more REs of the set of resources, one or more PRBs of the set of resources, one or more subbands of the set of resources, one or more OFDM symbols of the set of resources, one or more OFDM symbol groups of the set of resources, or a combination thereof.

In some examples of the method, apparatuses, and non-transitory computer-readable medium described herein, the respective size parameter for a segment of the set of segments corresponds to a number of REs for the segment, a number of PRBs for the segment, a number of OFDM symbols for the segment, a number of coded bits for the segment, or a combination thereof.

In some examples of the method, apparatuses, and non-transitory computer-readable medium described herein, a first NN-based encoder for a first segment of the set of segments may be different from a second NN-based encoder for a second segment of the set of segments. In some examples of the method, apparatuses, and non-transitory computer-readable medium described herein, a first NN-based encoder for a first segment of the set of segments may be the same as a second NN-based encoder for a second segment of the set of segments.

selection for autoencoder-based communication in accordance with aspects of the present disclosure.

Figure 3:
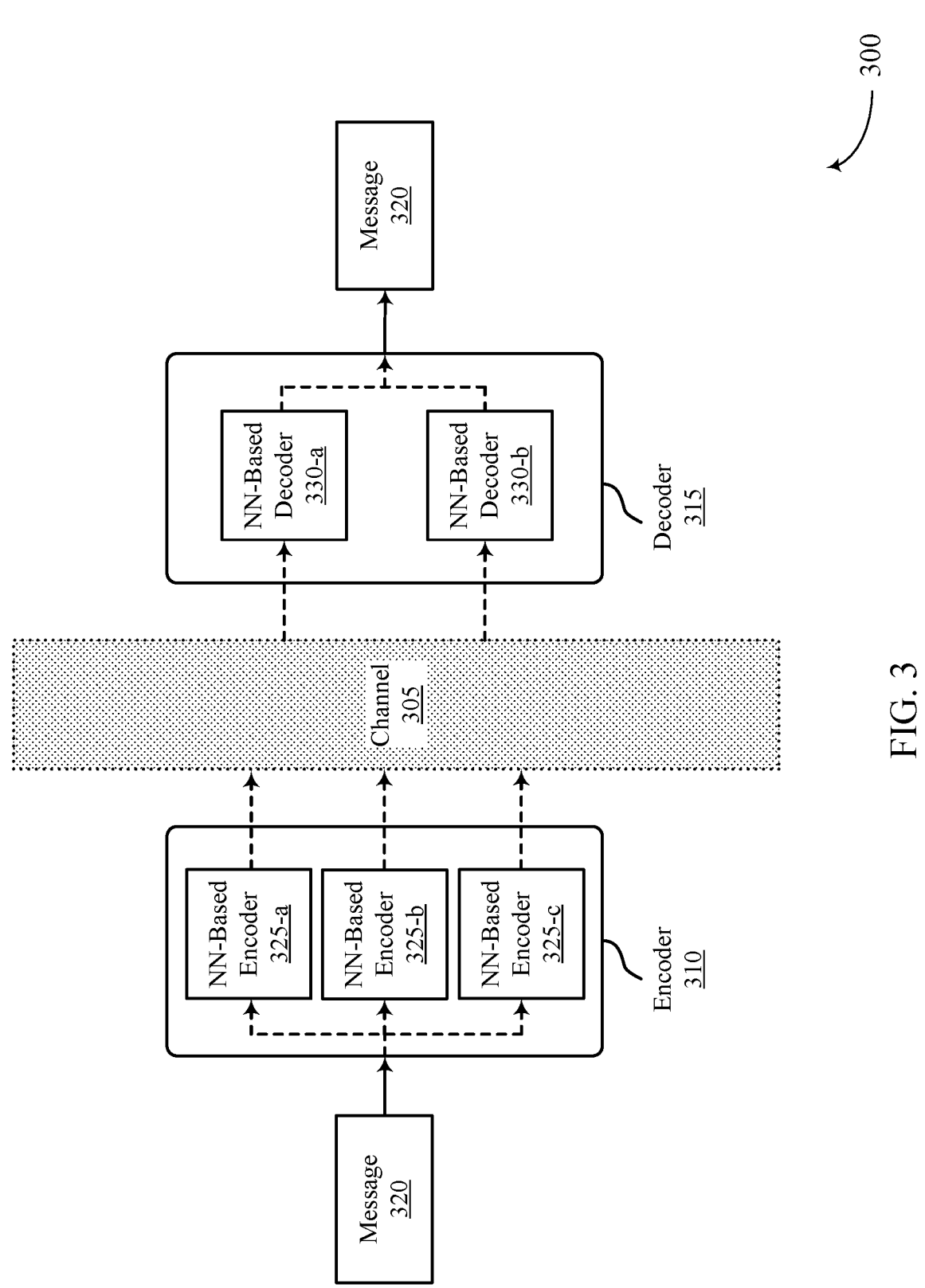

FIG. 3 illustrates an example of an autoencoder configuration that supports size-based NN selection for autoencoder-based communication in accordance with aspects of the present disclosure.

FIG. 4 illustrates an example of a segmented autoencoder configuration that supports size-based NN selection for autoencoder-based communication in accordance with aspects of the present disclosure.

Figure 5:
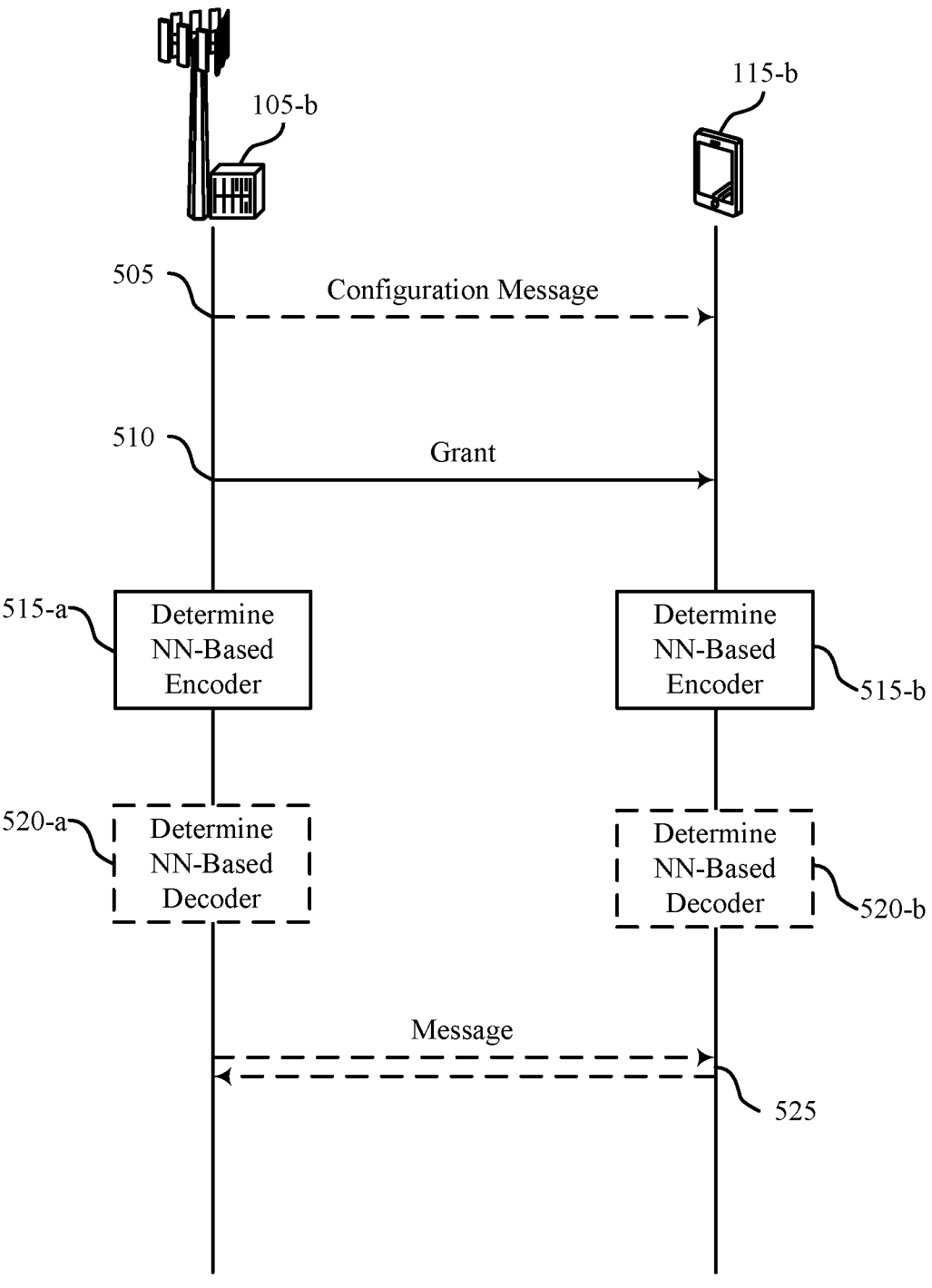
Figure 6:
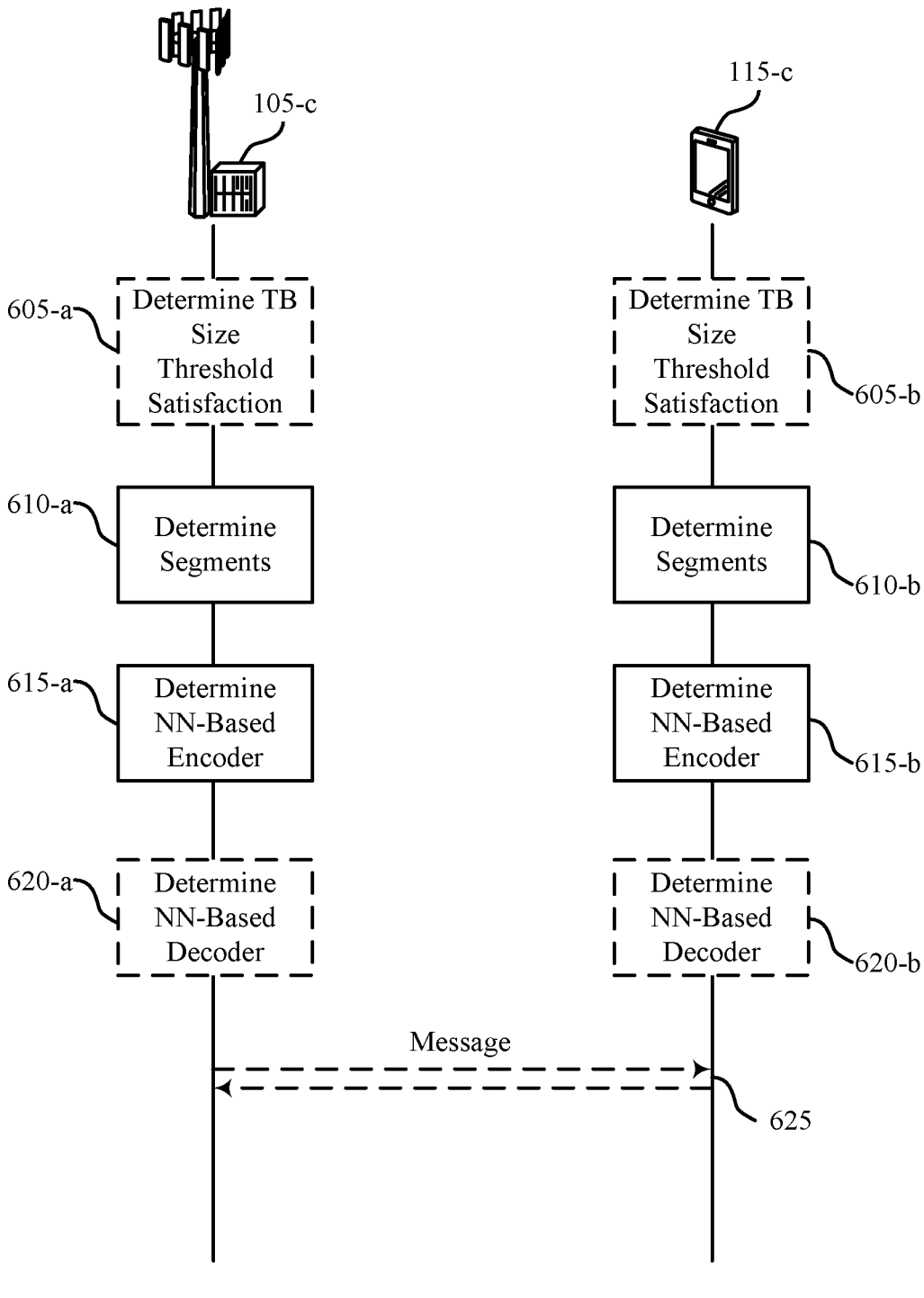

FIGS. 5 and 6 illustrate examples of process flows that support size-based NN selection for autoencoder-based communication in accordance with aspects of the present disclosure.

Figure 7:
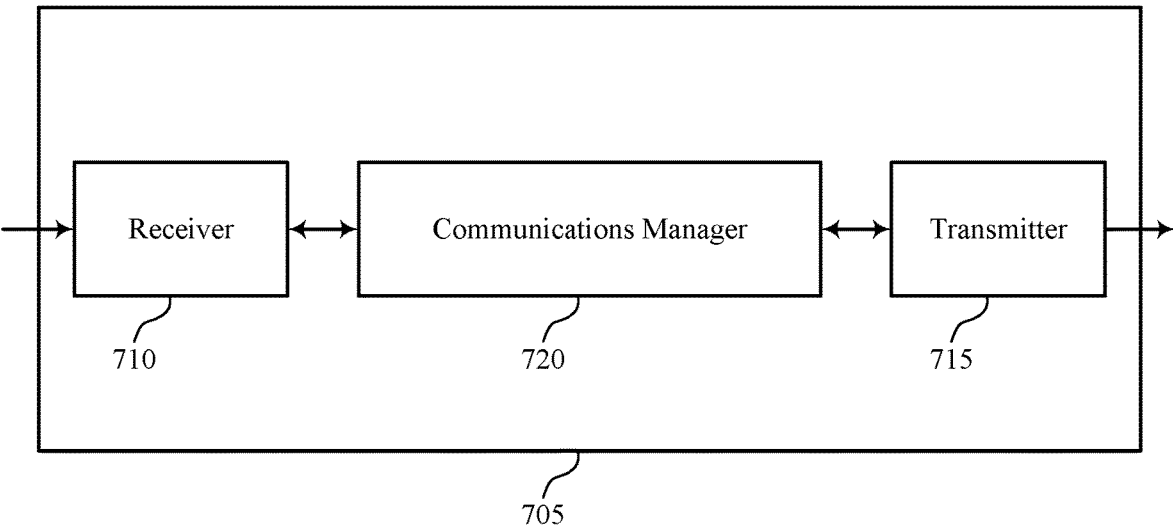
Figure 8:
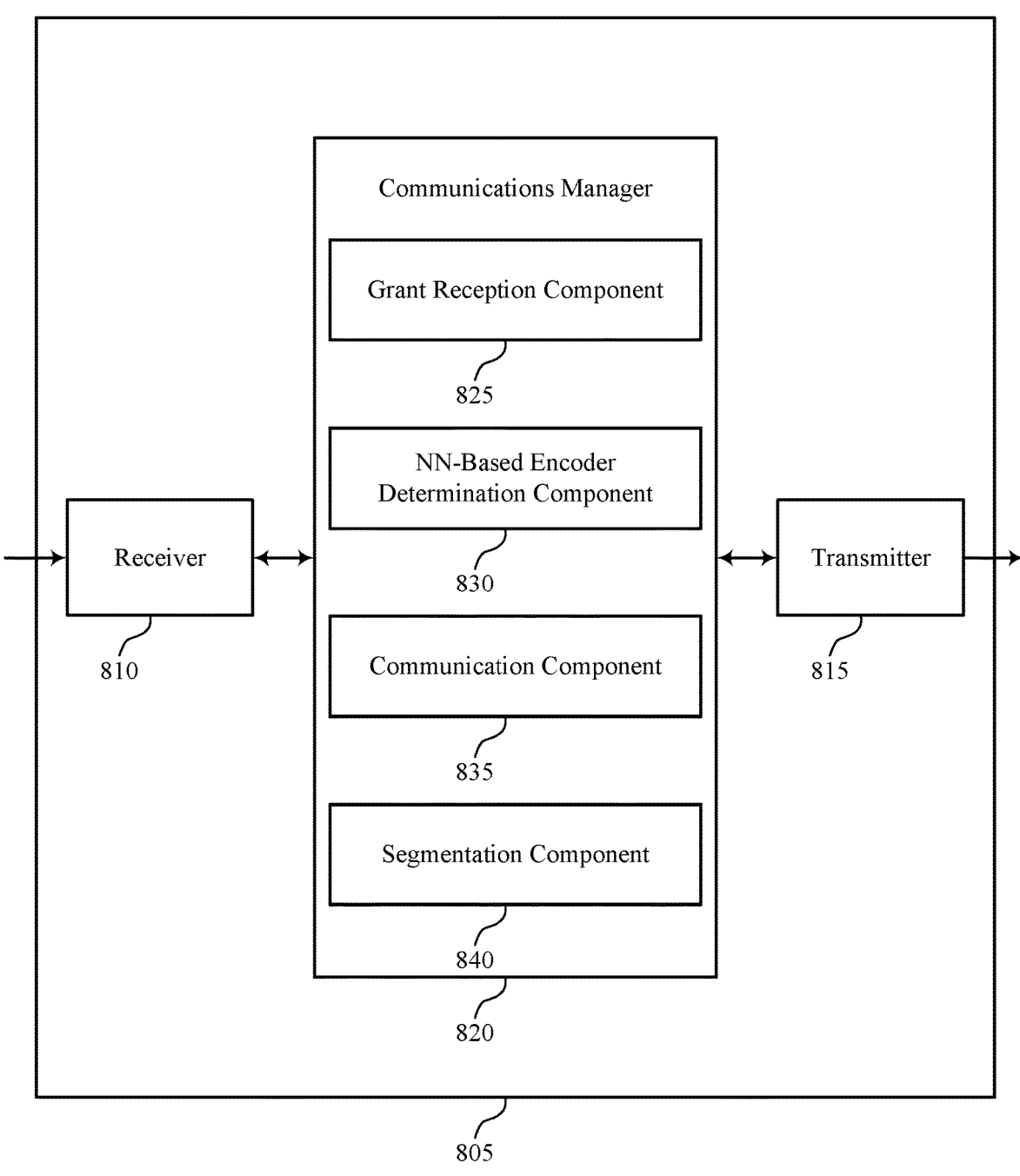

FIGS. 7 and 8 show block diagrams of devices that support size-based NN selection for autoencoder-based communication in accordance with aspects of the present disclosure.

Figure 9:
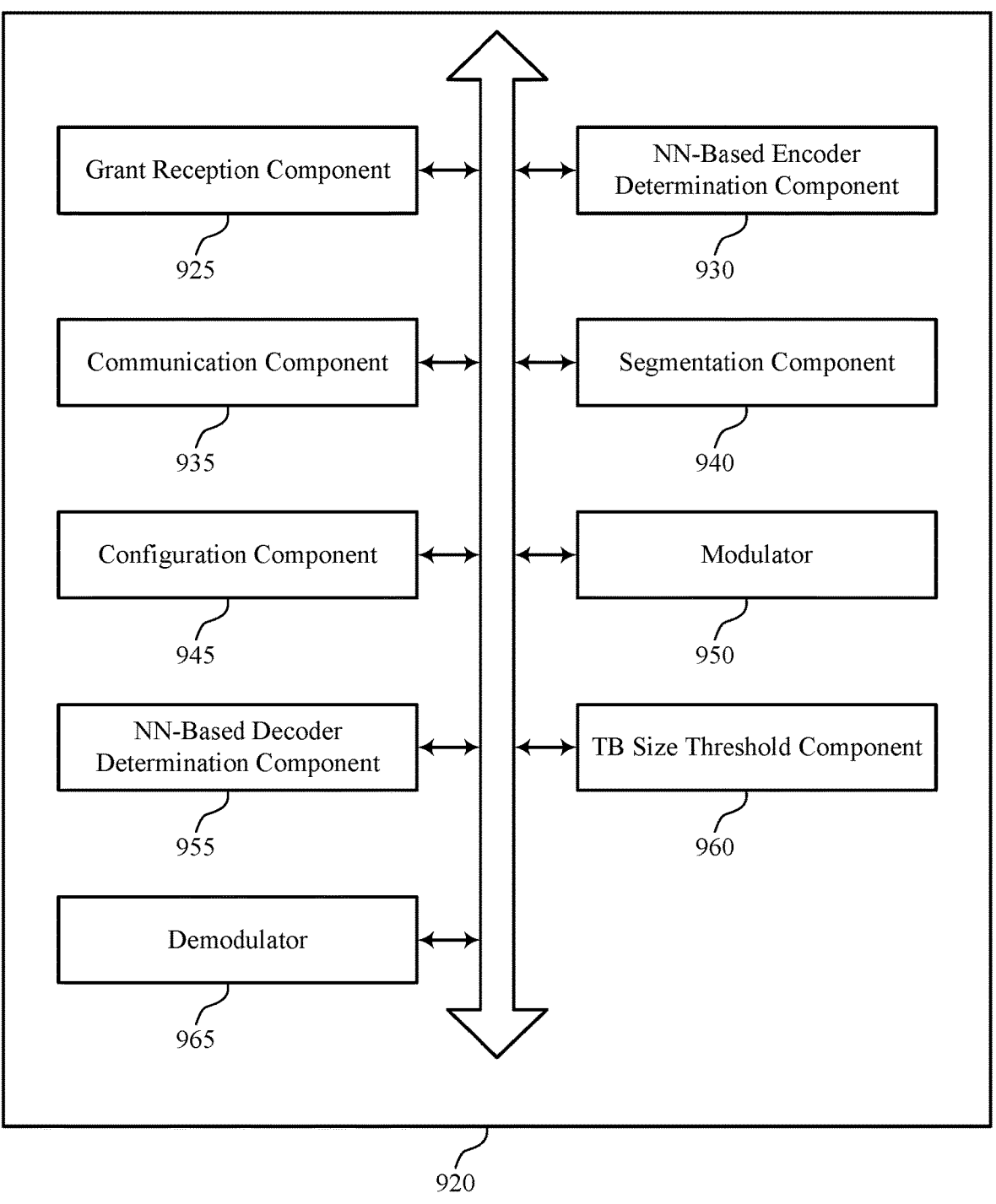

FIG. 9 shows a block diagram of a communications manager that supports size-based NN selection for autoencoder-based communication in accordance with aspects of the present disclosure.

Figure 10:
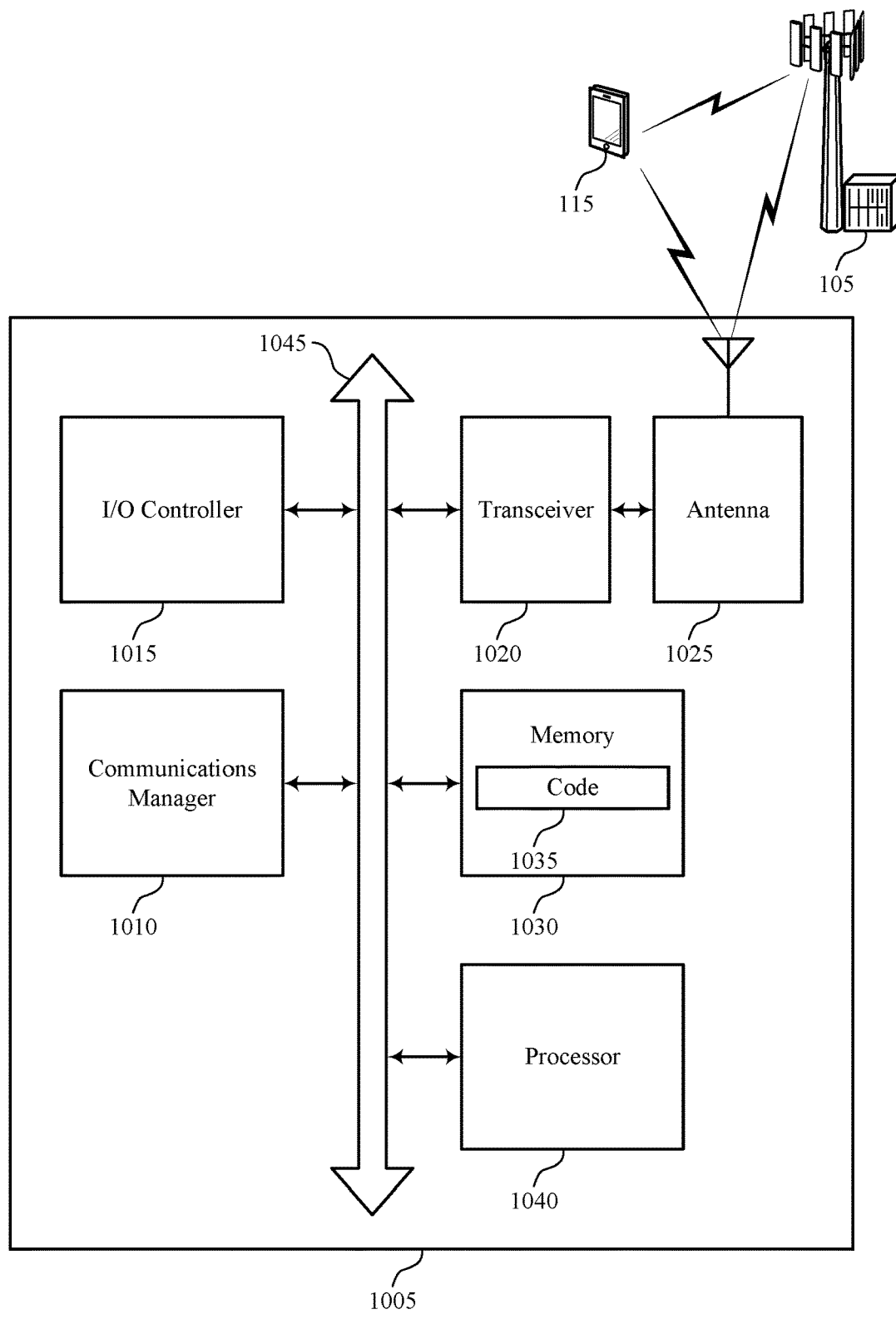

FIG. 10 shows a diagram of a system including a device that supports size-based NN selection for autoencoder-based communication in accordance with aspects of the present disclosure.

Figure 11:
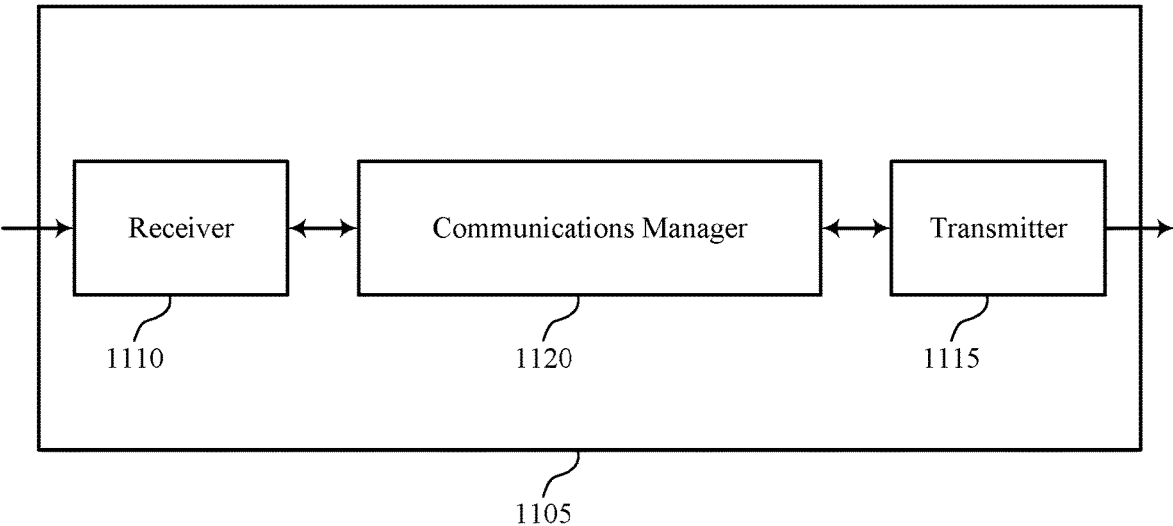
Figure 12:
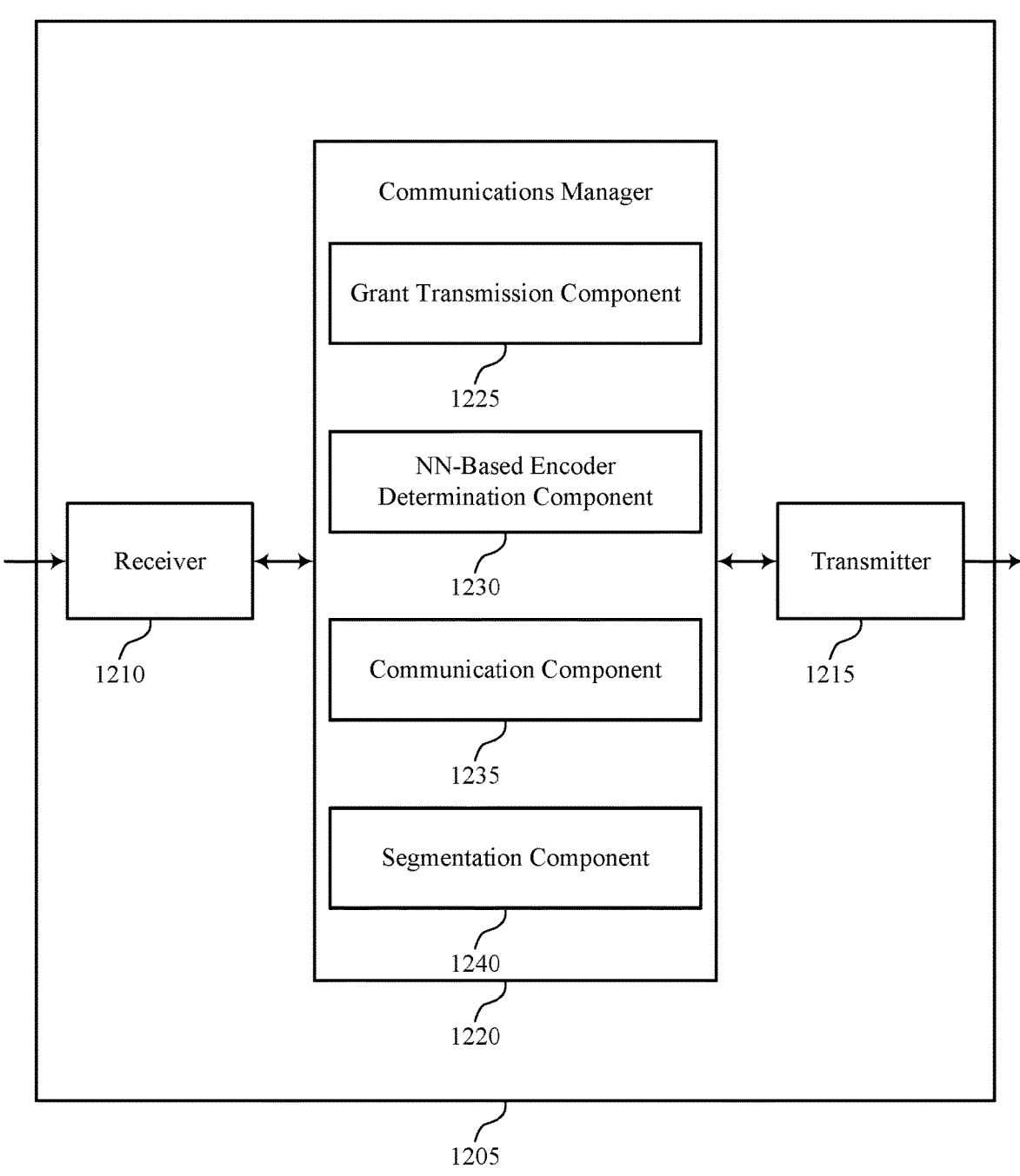

FIGS. 11 and 12 show block diagrams of devices that support size-based NN selection for autoencoder-based communication in accordance with aspects of the present disclosure.

Figure 13:
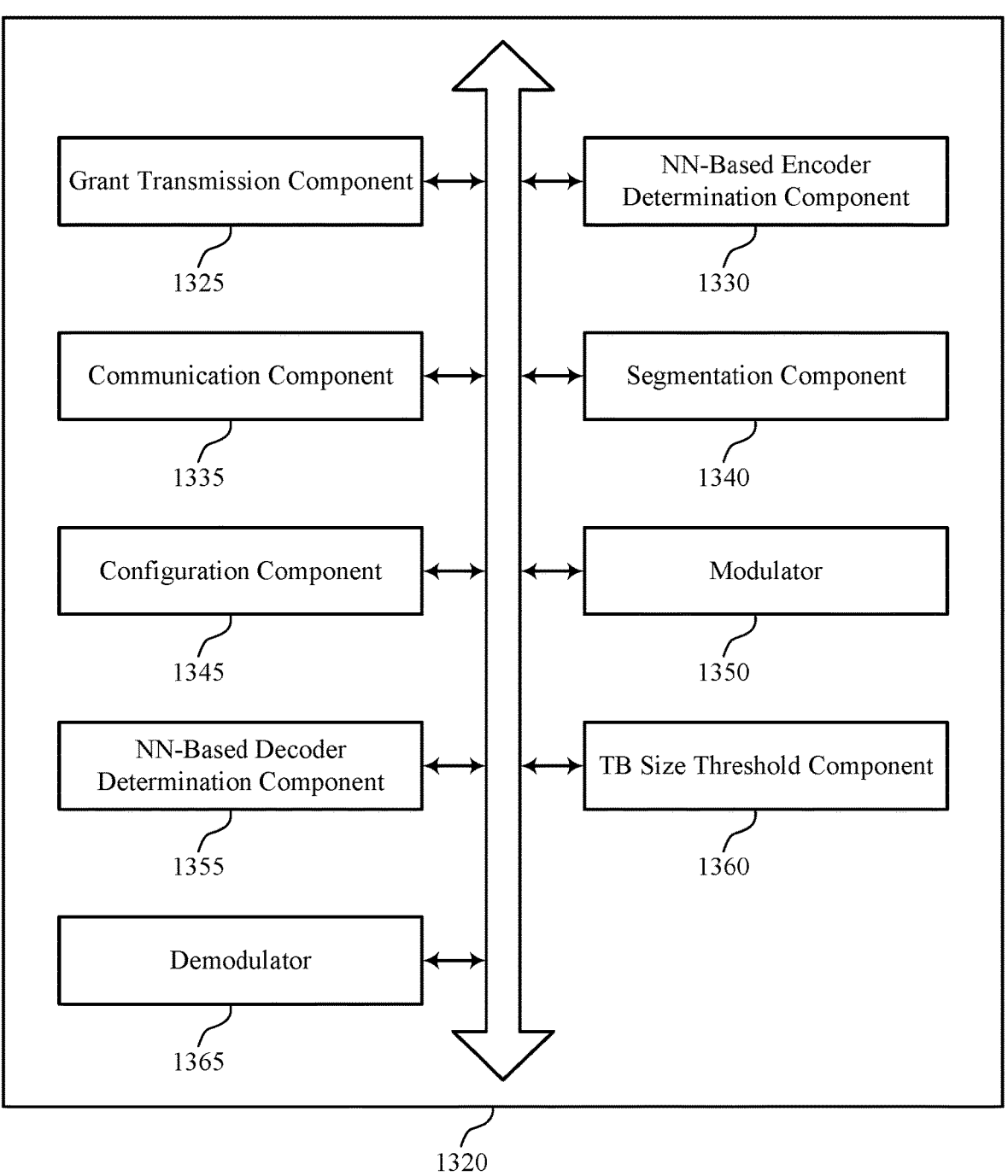

FIG. 13 shows a block diagram of a communications manager that supports size-based NN selection for autoencoder-based communication in accordance with aspects of the present disclosure.

Figure 14:
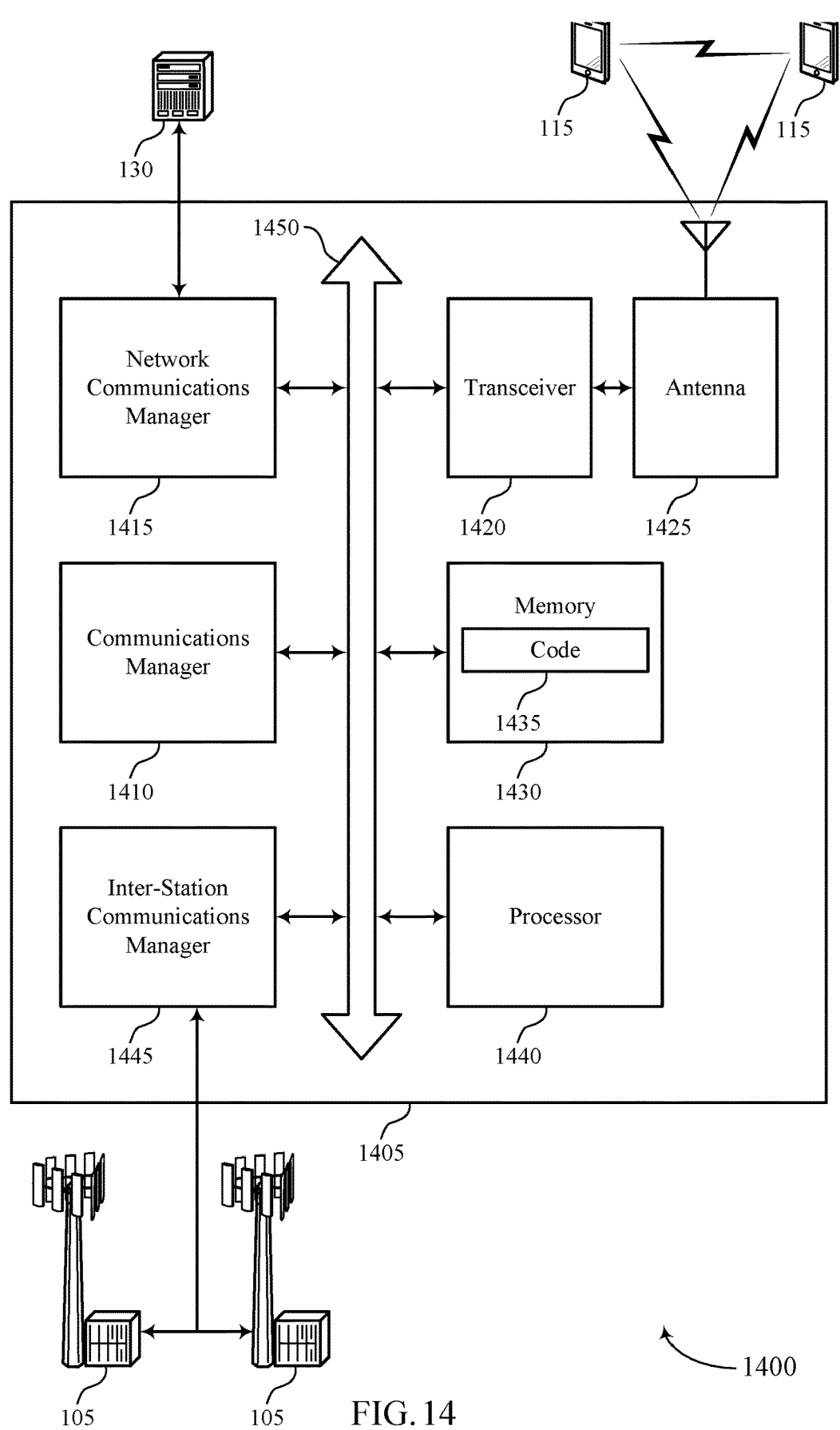

FIG. 14 shows a diagram of a system including a device that supports size-based NN selection for autoencoder-based communication in accordance with aspects of the present disclosure.

FIGS. 15 through 19 show flowcharts illustrating methods that support size-based NN selection for autoencoder-based communication in accordance with aspects of the present disclosure.

DETAILED DESCRIPTION

In some wireless communications systems, a wireless device (e.g., a user equipment (UE) or a base station) may utilize autoencoder-based communications. An autoencoder may be an example of a neural network (NN) system that modulates a message, demodulates a message, or both. The autoencoder may include an NN-based encoder and an NN-based decoder, and the autoencoder may train the NNs for compressing messages for efficient transmission and decompressing messages for accurate determination of the compressed information respectively. As part of the autoencoder design, the NN-based encoder and NN-based decoder may be trained jointly such that an input to the encoder may be recovered as an output of the decoder. As such, a receiving device using the NN-based decoder of an autoencoder may successfully receive and decode a message from a transmitting device using the NN-based encoder of the autoencoder.

An autoencoder may be optimized or otherwise trained based on a specific message size for communication. In some examples, to handle a range of different message sizes, a wireless device may implement multiple autoencoders. However, in some cases, wireless communications systems supporting multiple autoencoders may not indicate which autoencoder (e.g., NN-based encoder, NN-based decoder) to use at a wireless device. Accordingly, such a wireless device may potentially experience a significant processing overhead when using an autoencoder not suitable (e.g., not trained or otherwise configured) for a specific message size. For example, a wireless device may experience significant encoding or decoding complexity when employing an autoencoder (e.g., NN-based encoder, NN-based decoder) suitable for communicating relatively small messages to encode or decode a relatively larger message (e.g., a message above a threshold size). Further, if the message is communicated in a non-coherent transmission, channel estimation may be unavailable to support modulation or demodulation techniques for the message using a single autoencoder.

Techniques are described herein for a UE and a base station to select an NN from a set of multiple NNs for autoencoder-based communications based on a size parameter for a message. In some cases, the message may be communicated in a non-coherent transmission (e.g., a transmission lacking reference signals, such as demodulation reference signals (DMRSs), for channel estimation). In some cases, the UE may be configured (e.g., configured by a base station or pre-configured) with a set of multiple NN-based encoders. The UE may receive a grant from a base station indicating a size parameter for communicating a message and may determine an NN-based encoder from the configured set of NN-based encoders based on the size parameter. For example, the size parameter may be a transport block (TB) size for the message or another size parameter indicated by the grant. The UE and base station may communicate the message based on the determined NN-based encoder. For example, for uplink transmissions, the UE may use the NN-based encoder to modulate the message for transmission, and the base station may use the NN-based encoder to determine a corresponding NN-based decoder for demodulating the message. Alternatively, for downlink transmissions, the base station may use the NN-based encoder, and the UE may use the NN-based decoder. Additionally or alternatively, the UE, base station, or both may use multiple NN-based encoders, NN-based decoders, or both for communications. For example, a wireless device (e.g., UE or base station) may determine, for the total set of resources allocated for communicating the message, multiple different segments of resources and respective NN-based encoders for the multiple different segments.

In some examples, the configuration may map each configured NN-based encoder to a respective set of size parameters. In some cases, the base station may transmit a configuration message to the UE, where the configuration message indicates the set of NN-based encoders as well as one or more size parameters corresponding to each NN-based encoder of the set of NN-based encoders. In some other cases, the UE may be pre-configured with the set of NN-based encoders and one or more size parameters corresponding to each NN-based encoder of the set of NN-based encoders (e.g., in a lookup table or another format). Additionally or alternatively, the grant may indicate a transmission direction (e.g., uplink or downlink) for communicating the message. The grant may be an example of a dynamic uplink grant, a configured grant, a dynamic downlink grant, a semi-persistent scheduling (SPS) configuration, or a combination thereof.

In some examples, multiple NN-based encoders may be associated with a specific size parameter. In some such examples, the base station may explicitly indicate an NN-based encoder index in the grant, and the UE and base station may determine an NN-based encoder from the multiple NN-based encoders based on the indicated index. In some other such examples, the NN-based encoder may be implicitly determined from the multiple NN-based encoders based on one or more transmission parameters, where the transmission parameters may include a bandwidth indicator, a modulation scheme, a channel coding rate, or a combination thereof. Additionally or alternatively, the UE, base station, or both may determine the NN-based decoder based on a mapping from each NN-based encoder to a specific NN-based decoder, an NN-based decoder index indicated by the grant, or a combination thereof.

In some examples, the UE, the base station, or both may determine to implement the resource segmentation technique based on a threshold value. For example, a device may determine to segment the allocated resources for NN-based encoder selection based on a TB size for the message satisfying a threshold size. The device may determine a respective NN-based encoder for each segment of the set of segments based on a respective size parameter for each segment. For example, a first NN-based encoder determined for a first segment of the set of segments may be the same as or different from a second NN-based encoder determined for a second segment of the set of segments. Additionally or alternatively, the device may determine a respective NN-based decoder for each segment of the set of segments based on the respective size parameter for each segment, the determined respective NN-based encoder, or both. Each NN-based decoder may correspond to the determined respective NN-based encoder for each segment of the set of segments. The device may communicate the message in the allocated resources based on the determined respective NN-based encoder for each segment of the set of segments. For example, a device transmitting the message may modulate at least a portion of the message in each segment of resources using the determined respective NN-based encoders to support transmitting the message. A device receiving the message may demodulate the message in each segment of resources using the determined respective NN-based decoders for each segment.

Aspects of the disclosure are initially described in the context of wireless communications systems. Additional aspects of the disclosure are described with reference to autoencoder configurations and process flows. Aspects of the disclosure are further illustrated by and described with reference to apparatus diagrams, system diagrams, and flowcharts that relate to size-based NN selection for autoencoder-based communication.

Figure 1:
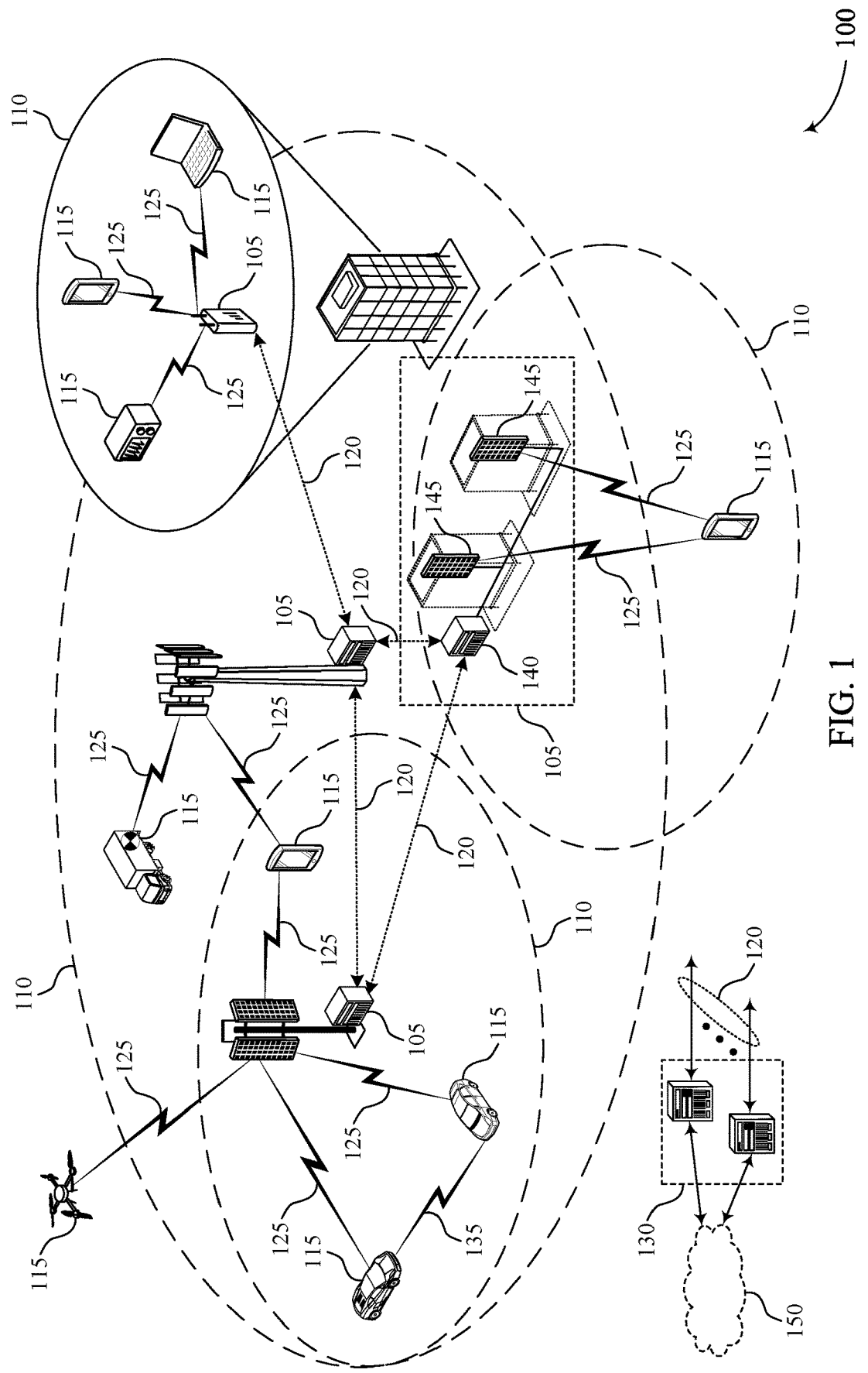
FIGS. 1 and 2 illustrate examples of wireless communications systems that support size-based neural network (NN)

FIG. 1 illustrates an example of a wireless communications system 100 that supports size-based NN selection for autoencoder-based communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFTS-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be coupled to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems 100 may support transmissions with reference signals, such as demodulation reference signals (DMRSs), to support channel estimation at a receiving device. In some cases, such as in highly-mobile environments and/or environments with high Doppler shifts (e.g., in enhanced mobile broadband (eMBB) systems), the channel may vary rapidly in the time domain. As such, a device may transmit a significant number of reference signals for channel estimation to accurately capture the varying channel, leading to significant processing overhead associated with channel estimation and channel overhead associated with reference signaling. Additionally or alternatively, if a device transmits relatively small packets (e.g., below a threshold size), such as in massive machine-type communications (mMTC) systems or for sidelink communications, the reference signals for channel estimation may dominate the channel overhead (e.g., DMRSs may take up a significant portion of the transmission based on the relatively small packet size) and result in relatively poor spectral efficiency (e.g., below a threshold). Additionally or alternatively, if the channel experiences a low signal-to-noise ratio (SNR) (e.g., below a threshold value), such as in mMTC systems, for sidelink communications, for Bluetooth communications, etc., the channel estimation performance may be limited, resulting in relatively poor spectral efficiency (e.g., below a threshold) when implementing DMRSs. In some such cases, or in other environments, wireless devices may implement non-coherent transmissions (e.g., transmissions without DMRSs). In some examples, the non-coherent transmissions may reduce the channel overhead, improve the spectral efficiency, and avoid performance degradation in modulation and decoding as compared to transmissions including DMRSs.

In some examples, because non-coherent transmissions do not include DMRSs, wireless devices receiving non-coherent transmissions may estimate channel state information (CSI) to obtain decoding metrics (e.g., a maximum likelihood estimation metric), modulation and coding schemes (MCSs), constellation mapping configurations, forward error correction (FEC) coding, or any combination of these or other factors for communication over the channel. However, estimating the CSI distribution for the channel may use a large processing overhead (e.g., over a threshold value). Additionally or alternatively, the estimated CSI distribution may be mismatched with the actual CSI for the non-coherent transmission. Furthermore, estimating constellation mapping for non-coherent transmission may grow exponentially complex as more UEs 115 transmit signaling to a base station 105 (e.g., in uplink multiuser single input-multiple output (MU-SIMO) communications), as the number of constellation points increases, and as the number of slots increases.

In the wireless communications system 100, a UE 115 and a base station 105 may implement autoencoder-based communications based on a size parameter for communicating a message. In some cases, the message may be communicated in a non-coherent transmission, as described herein. However, in some other cases, the message may include DMRSs or other reference signaling supporting channel estimation. The UE 115 may be configured with a set of multiple NN-based encoders, where each NN-based encoder is trained to handle a specific message size or range of sizes. In some examples, the UE 115 may receive, from the base station 105, a grant indicating the size parameter for communicating a message. Based on the size parameter, the UE 115 and the base station 105 may each determine an NN-based encoder (e.g., the same NN-based encoder from the set of multiple NN-based encoders configured for the UE 115). Additionally, the UE 115 or the base station 105 may determine an NN-based decoder for the message that corresponds to the determined NN-based encoder. The UE 115 and the base station 105 may communicate the message according to the grant and based on the determined NN-based encoder, the determined NN-based decoder, or both. For example, a transmitting device (e.g., a UE 115 or a base station 105) may transmit the message using the determined NN-based encoder, and a receiving device (e.g., a UE 115 or a base station 105) may receive the message using the determined NN-based decoder. Such techniques may be used for uplink communications, downlink communications, sidelink communications, backhaul communications, or any other types of wireless communications. In some examples, the wireless devices may use separate NN-based encoders, decoders, or both for different segments of allocated resources. In some such examples, the different segments of allocated resources may be determined based on respective size parameters of the segments.

Figure 2:
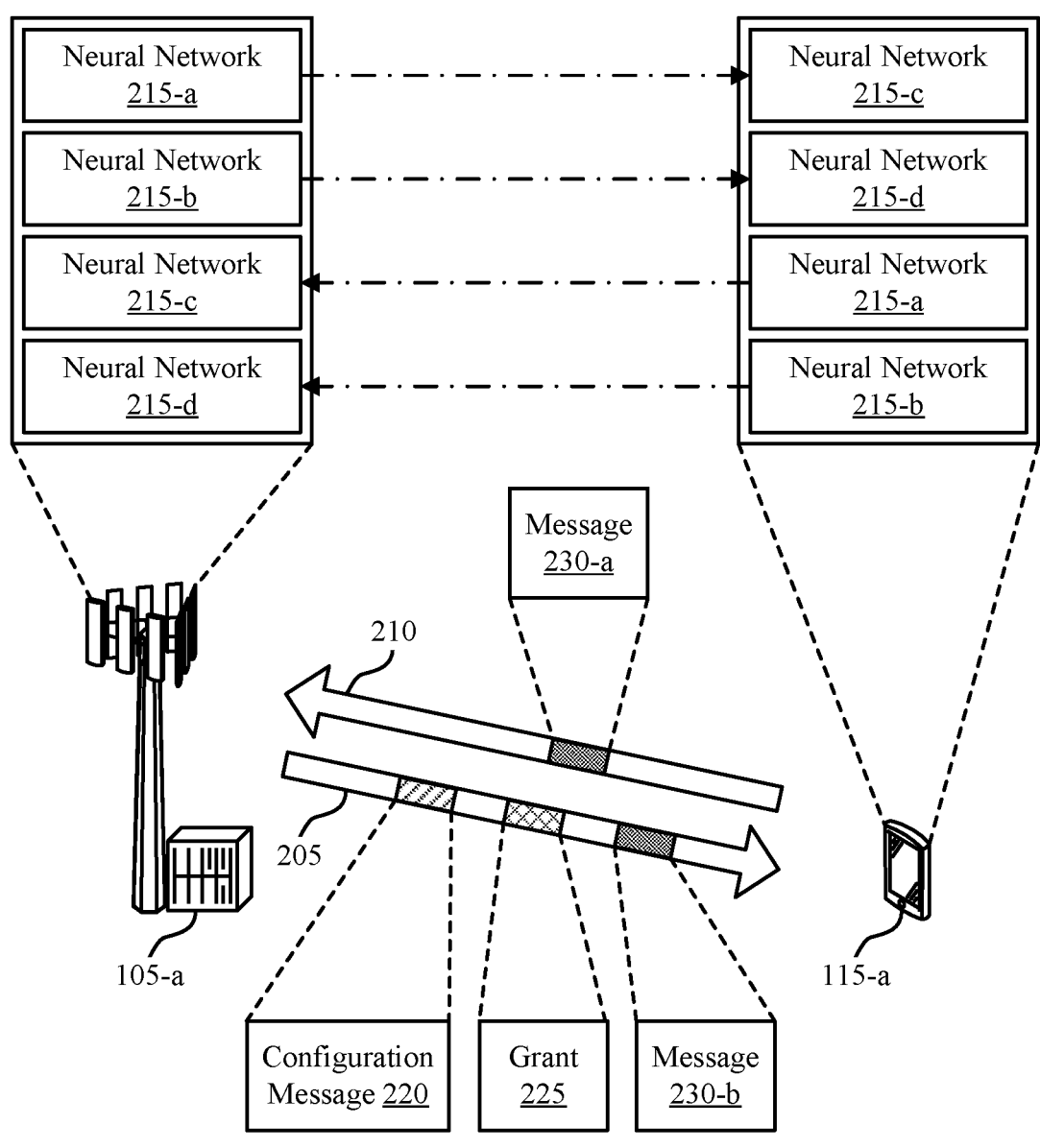

FIG. 2 illustrates an example of a wireless communications system 200 that supports size-based NN selection for autoencoder-based communication in accordance with aspects of the present disclosure. In some examples, the wireless communications system 200 may implement aspects of a wireless communications system 100. The wireless communications system 200 may include base station 105-a and UE 115-a, which may be examples of the corresponding devices as described herein. Base station 105-a and UE 115-a may communicate via a downlink communication link 205 and an uplink communication link 210. The wireless communications system 200 may support autoencoder-based communications between base station 105 a and UE 115 a, which may improve spectral efficiency and signaling overhead.

In some examples, the wireless communications system 200 may support non-coherent communications. For example, a wireless device (e.g., a UE 115 or base station 105) in a high-mobility environment (e.g., with a high Doppler shift or delay spread above a threshold value) or transmitting small data packets (e.g., below a threshold packet size) may implement non-coherent communications. Additionally or alternatively, a wireless device may communicate using non-coherent transmissions if a detected SNR value or other channel metric (e.g., signal-to-interference-plus-noise ratio (SINR)) is below a threshold value. In such examples, the wireless device may communicate messages without reference signals (e.g., DMRSs) for channel estimation, which may reduce the signaling overhead and improve the spectral efficiency as compared to coherent transmissions (e.g., transmissions with reference signals for channel estimation). Referring to FIG. 2, in some cases, base station 105-a and UE 115-a may communicate using non-coherent transmissions. In some other cases, base station 105-a and UE 115-a may communicate messages with reference signals (e.g., DMRSs) for channel estimation.

UE 115-a and base station 105-a may implement autoencoders for handling communications. An autoencoder may be an example of an NN system that modulates and demodulates a message 230. Additionally or alternatively, an autoencoder may encode and decode a message 230. UE 115-a and base station 105-a may determine an autoencoder for communicating a message 230 (e.g., message 230-a on the uplink or message 230-b on the downlink). The autoencoder may support modulating and/or demodulating the message 230 at a sequence-based level or a symbol-based level. The NNs 215 of the autoencoder may be trained using machine learning techniques to determine efficient data encodings (e.g., using unsupervised model training, supervised model training, or a combination thereof). In some examples, an original equipment manufacturer (OEM) may train the NNs 215 of the autoencoder offline. Additionally or alternatively, a wireless device may train the NNs 215 of the autoencoder online. The autoencoder may include an NN-based encoder and an NN-based decoder. For example, NNs 215-a, 215-b, 215-c, and 215-d may each be utilized as NN-based encoders, NN-based decoders, or a combination thereof for base station 105-a. In a specific example, as illustrated in FIG. 2, NNs 215-a and 215-b may each be utilized as NN-based encoders and NNs 215-c and 215-d may each be utilized as NN-based decoders for UE 115-a.

The NNs 215 (e.g., an NN-based encoder and a corresponding NN-based decoder) may be jointly trained for compressing messages for efficient transmission and decompressing the messages for accurate determination of the compressed data. For example, a first autoencoder may include NN 215-a and NN 215-c, and NN 215-a and NN 215-c may be jointly trained such that NN 215-a encodes a message 230 and NN 215-c decodes the message 230 (e.g., based on the encoding by NN 215-a). In another example, a second autoencoder may include NN 215-b and NN 215-d, and NN 215-b and NN 215-d may also be jointly trained such that NN 215-b encodes a message 230 and NN 215-d decodes the message 230. However, the first and second autoencoders may be trained based on different message sizes, such that the first autoencoder may more efficiently handle a first range of message sizes as compared to the second autoencoder, and the second autoencoder may more efficiently handle a second range of message sizes as compared to the first autoencoder. Additionally or alternatively, base station 105-a and UE 115-a may be configured with additional autoencoders for handling downlink messages 230-b, uplink messages 230-a, or both.

As such, base station 105-a and UE 115-a may each be configured with one or more NNs 215 which may support different autoencoders for communications between base station 105-a and UE 115-a. However, if devices implementing multiple autoencoders do not indicate which autoencoder (e.g., NN-based encoder, NN-based decoder) to use for communications, a device receiving an encoded message may use a significant processing overhead to successfully receive and decode the message (e.g., by blindly testing a number of different NN-based decoders). Furthermore, in cases where a message 230 is communicated in a non-coherent transmission, channel estimation may be inaccurate or unavailable to indicate improvements for modulation or demodulation techniques, further increasing the processing complexity involved in successfully receiving the message 230.

Techniques are described herein for UE 115-a and base station 105-a to implement autoencoder-based communications with a set of multiple NNs 215 based on a size parameter for a message 230. In some cases, the message 230 may be communicated in a non-coherent transmission. In some other cases, the message 230 may be communicated with reference signals (e.g., DMRSs) supporting channel estimation.

In some cases, UE 115-a may be configured with a set of multiple NN-based encoders, a set of multiple NN-based decoders, or both. For example, UE 115-a may be configured with NN 215-a and NN 215-b as the set of multiple NN-based encoders. Additionally or alternatively, UE 115-a may be configured with NN 215-c and NN 215-d as the set of multiple NN-based decoders. UE 115-a may store the NNs 215 in memory, for example, including NN structures, NN parameters, or a combination thereof. In some cases, each NN-based encoder may correspond to an NN-based encoder index. In some examples, base station 105-a may transmit a configuration message 220 indicating the set of multiple NN-based encoders, NN-based decoders, or both to UE 115-a. For example, the configuration message 220 (e.g., a radio resource control (RRC) configuration message, a medium access control (MAC) control element (CE), or another configuration message) may indicate the NN structures, the NN parameters, the NN indices, or a combination thereof for the set of multiple NN-based encoders, the set of multiple NN-based decoders, or both. Additionally, the configuration message 220 may indicate one or more size parameters corresponding to each NN-based encoder of the set of NN-based encoders, each NN-based decoder of the set of NN-based decoders, or both. In some other examples, UE 115-a may be pre-configured with the set of multiple NN-based encoders, the one or more size parameters corresponding to each NN-based encoder of the set of NN-based encoders, the set of multiple NN-base decoders, the one or more size parameters corresponding to each NN-based decoder of the set of NN-based decoders, or a combination thereof.

In some examples, UE 115-a may receive, from base station 105-a, a grant 225 indicating the size parameter for communicating a message 230. The grant 225 may also indicate the transmission direction (e.g., downlink or uplink) for communicating the message 230. The grant 225 may be an example of a dynamic uplink grant or a configured grant granting UE 115-a a set of resources for transmitting a message 230-a on the uplink communication link 210. Alternatively, the grant 225 may be an example of a dynamic downlink grant or a semi-persistent scheduling (SPS) physical downlink shared channel (PDSCH) configuration granting UE 115-a a set of resources for receiving a message 230-b on the downlink communication link 205. The size parameter indicated by the grant may correspond to a transport block (TB) size for the message 230, a number of resource elements (REs) allocated for the message 230, a number of physical resource blocks (PRBs) allocated for the message 230, a number of orthogonal frequency domain multiplexing (OFDM) symbols allocated for the message 230, a number of coded bits for the message 230, or a combination thereof. In some cases, the size parameter may correspond to a product of multiplying one or more size parameters (e.g., the product of the number of allocated PRBs and the number of allocated OFDM symbols, indicating a total set of allocated resources for the message 230).

UE 115-a may determine an NN-based encoder from the set of multiple NN-based encoders configured at UE 115-a based on the size parameter. In some cases, the NN-based encoder may be determined to encode and/or modulate a message 230-a for transmission to base station 105-a. For example, UE 115-a may determine NN 215-a as the determined NN-based encoder based on the size parameter indicated in the grant 225. UE 115-a may use NN 215-a to modulate the message 230-a and may transmit the message 230-a to base station 105-a. In some cases, the determined NN-based encoder may indicate an NN-based encoder for a downlink message 230-b. For example, UE 115-a may determine NN 215-b as the NN-based encoder for a message 230-b. To receive the message 230-b, UE 115-a may further determine an NN-based decoder corresponding to the NN-based encoder. For example, UE 115-a may determine NN 215-d as the NN-based decoder corresponding to NN 215-b for receiving the message 230-b.

In some cases, base station 105-a may determine an NN-based encoder based on the size parameter indicated in the grant 225. The determined NN-based encoder of base station 105-a may be determined from the set of multiple NN-based encoders configured for UE 115-a (e.g., NNs 215-a and 215-b) or from another set of NN-based encoders configured at base station 105-a. Base station 105-a may use the determined NN-based encoder to transmit a message 230-b or to determine a corresponding NN-based decoder to receive a message 230-a. For example, UE 115-a and base station 105-a may both determine NN 215-a as the NN-based encoder for a message 230-a based on a size parameter indicated in a grant 225 (e.g., an uplink grant). Base station 105-a may further determine NN 215-c as the NN-based decoder corresponding to the determined NN-based encoder. UE 115-a may transmit the message 230-a according to the grant 225 (e.g., using the granted resource) and using NN 215-a as the NN-based encoder, and base station 105-a may receive the message 230-a according to the grant 225 and using NN 215-c as the NN-based decoder. Accordingly, both UE 115-a and base station 105-a may select NNs 215 (e.g., an autoencoder) for communication based on information included in the grant 225 for communication.

In some cases, multiple NN-based encoders may be associated with a single size parameter. For example, UE 115-a may store Table 1 as a lookup table in memory, where Table 1 indicates the mapping between size parameters and NNs 215.

TABLE 1

Mapping between size parameters and NNs

| Size Parameter | NN #1 | NN #2 | NN #3 | NN #4 | NN #5 |
|---|---|---|---|---|---|
| Level 1 | X | X | | | |
| Level 2 | | X | X | X | |
| Level 3 | | | | X | X |

In Table 1, UE 115-a may be configured with five NNs 215 for encoding, where the X's indicate which size parameters correspond to which NNs 215. Each level may correspond to a range of size parameters for a message 230. For example, if the size parameter is a TB size, Level 1 may correspond to TB sizes below a first threshold value, Level 2 may correspond to TB sizes greater than or equal to the first threshold value and less than a second threshold value, and Level 3 may correspond to TB sizes greater than or equal to the second threshold value. As illustrated, in some cases, a size parameter may correspond to one or more NNs 215, and an NN 215 may correspond to one or more size parameters. If UE 115 a receives a grant 225 indicating a size parameter that corresponds to multiple NNs 215 (e.g., a subset of NNs 215) of the configured set of NNs 215, UE 115 a may select one NN 215 from the multiple NNs 215 based on an explicit or implicit indication. In some examples, base station 105 a may explicitly indicate an NN-based encoder index in the grant 225 (e.g., in an NN-based encoder index field of the grant 225) to indicate one NN-based encoder. For example, the size parameter may indicate Level 1 corresponding to NNs #1 and #2, and the grant 225 may indicate NN #2 as the NN-based encoder. In some other examples, UE 115 a may implicitly determine the NN-based encoder based on one or more transmission parameters, such as a bandwidth indicator, a modulation scheme, a channel coding rate, or a combination thereof. The mapping from the transmission parameter(s) to an NN-based encoder may be configured at UE 115 a (e.g., configured by base station 105 a or pre-configured). For example, the size parameter may indicate Level 2 corresponding to NNs #2, #3, and #4, and UE 115 a may determine NN #3 from this subset of NNs 215 based on a bandwidth indicator for communication. Base station 105 a may use the same set of techniques to determine the NN-based encoder (e.g., such that UE 115 a and base station 105 a are coordinated in selecting a same NN-based encoder from a configured set of multiple NN-based encoders).

In some examples, UE 115-a may determine an NN-based decoder for a message 230-b. For example, UE 115-a may determine the NN-based decoder to demodulate and/or decode the message 230-b. Similarly, base station 105-a may determine an NN-based decoder to demodulate and/or decode a message 230-a. In some cases, the wireless devices (e.g., UE 115-a and base station 105-a) may map each NN-based encoder to an the NN-based decoder. For example, UE 115-a may map NN 215-a to NN 215-c and may map NN 215-b to NN 215-d. As such, an NN-based decoder may be determined directly from an NN-based encoder. In some other cases, the wireless devices may determine an NN-based decoder based on an NN-based decoder index indicated in the grant 225. For example, the grant 225 may indicate NN 215-d as the NN-based decoder for UE 115-a. In this way, UE 115-a may determine an autoencoder for communication (e.g., an NN-based encoder and a corresponding NN-based decoder).

In some examples, the wireless devices may override an NN 215 selection. For example, base station 105-a may indicate NN 215-a using an NN-based encoder index in the grant 225, but UE 115-a may select NN 215-b as the NN-based encoder based on one or more selection rules. Additionally or alternatively, UE 115-a may determine NN 215-b as the NN-based encoder based on one or more selection rules (e.g., based on the size parameter indicated by the grant 225), and UE 115-a may instead select NN 215-*a* as the NN-based encoder based on an NN-based encoder index indicated by base station 105-*a* in the grant 225.

Using the techniques described herein, based on a size parameter for a message 230, UE 115-*a* and base station 105-*a* may determine a same NN-based encoder from a set of multiple configured NN-based encoders (e.g., an NN-based encoder configured to handle messages of a specific size indicated by the size parameter). UE 115-*a* and base station 105-*a* may use described techniques for uplink transmission on a physical uplink control channel (PUCCH), for uplink transmission on a physical uplink shared channel (PUSCH), for downlink transmission on a physical downlink control channel (PDCCH), for downlink transmission on a PDSCH, or for communications on any other channels. For non-coherent transmissions, a wireless device may demodulate a received message using an NN-based decoder determined based on the NN-based encoder, reducing the processing overhead and complexity involved in successfully demodulating a non-coherent transmission.

FIG. 3 illustrates an example of an autoencoder configuration 300 that supports size-based NN selection for autoencoder-based communication in accordance with aspects of the present disclosure. In some examples, the autoencoder configuration 300 may implement aspects of a wireless communications system 100 or 200. For example, a UE 115 or a base station 105, as described with reference to FIGS. 1 and 2, may implement the autoencoder configuration 300. The autoencoder configuration 300 may support encoding a message 320, modulating a message 320, or both and decoding a message 320, demodulating a message 320, or both using one or more autoencoders. For example, a first device (e.g., a UE 115 or a base station 105) may use an encoder 310 of the autoencoder configuration 300 for message transmission and a second device (e.g., a UE 115 or a base station 105) may use a decoder 315 of the autoencoder configuration 300 for message reception. The first device may determine between a configured set of NN-based encoders 325 and the second device may determine between a configured set of NN-based decoders 330 for communications. In some examples, the autoencoder configuration 300 may improve spectral efficiency and signaling overhead for communications.

In some cases, a base station 105 or UE 115 may determine CSI measurements for a channel 305 using reference signals, such as DMRSs. However, in cases of non-coherent transmission, CSI measurements may be unavailable to a wireless device due to the non-coherent transmissions not including reference signals for channel estimation. Further, estimating CSI distribution (e.g., based on an estimated SNR value or a Gaussian or other estimated distribution of the channel) may introduce a large processing overhead at a wireless device (e.g., over a processing threshold). Additionally, estimating a CSI distribution may introduce inaccuracies as compared to the actual CSI distribution of the channel 305. A UE 115 or base station 105 may implement autoencoder-based communications for improved performance over the channel 305.

The autoencoder configuration 300 may be an example of an NN system that modulates and demodulates messages 320 via an encoder 310 and a decoder 315, respectively. The autoencoder configuration 300 may support a number of autoencoders, where each autoencoder may be jointly designed—for example, via artificial intelligence (AI) or other machine learning techniques—to support transmission and reception. A message 320 may be input to an NN-based encoder 325 of the encoder 310 as a bit sequence and the message 320 may be output from an NN-based decoder 330 of the decoder 315 as a bit sequence. However, in some cases, autoencoders may modulate and/or demodulate at a sequence-based or symbol-wise transmission level. A system or device may perform machine learning to train the NNs of the encoder 310 and the decoder 315 to determine efficient modulation techniques and decoding metrics. In some examples, NNs may reduce complexity and signaling overhead for communicating messages 320 as compared to other modulation and/or demodulation techniques. NN-based encoders 325-*a*, 325-*b*, and 325-*c* may each correspond to an NN configured at the encoder 310. Likewise, NN-based decoders 330-*a* and 330-*b* may each correspond to an NN configured at the decoder 315.

As an example, a transmitting device may select NN-based encoder 325-*a* from a configured set of NN-based encoders 325 (e.g., as described with reference to FIG. 2) to modulate a message 320. For example, the transmitting device may use NN-based encoder 325-*a* to modulate a sequence of bits representing the message 320—or a portion of the message 320—onto physical resources of the channel 305. The transmitting device may transmit the modulated message 320 to a receiving device via the channel 305. The receiving device may select NN-based decoder 330-*a* from a configured set of NN-based decoders 330 to demodulate the message 320 from the physical resources and obtain an estimated bit sequence. In some examples, the NN-based decoder 330-*a* may determine a decoding metric for the channel 305 (e.g., without DMRSs for non-coherent transmissions). The decoder 315 may output a resulting message 320 based on the determined bit sequence. In some cases, a base station 105 receiving messages from multiple UEs 115 may determine estimated bit sequences for the different UEs 115 using one or more NN-based decoders 330.

In some examples, an autoencoder may be trained offline, online, or a combination thereof. For example, an OEM may train an autoencoder offline using CSI samples and may configure one or more base stations 105, one or more UEs 115, or both with the trained autoencoder. Additionally or alternatively, a wireless device may train the autoencoder online based on CSI measurements. In some examples, a wireless device may perform the online training during down periods (e.g., when a processing overhead at the device is below a processing overhead threshold). An updated autoencoder may be implemented based on a performance metric. For example, if the performance metric exceeds a performance threshold, the updated autoencoder may be activated at the wireless device. In some cases, to support coordination between a UE 115 and a base station 105, the device training the autoencoder may transmit an indication of the trained autoencoder to the other device. Implementing an autoencoder may offer greater efficiency for non-coherent communications than other modulation/demodulation techniques by reducing the processing overhead for assessing CSI distribution. Additionally or alternatively, implementing an autoencoder may improve the efficiency associated with determining a decoding metric, a constellation, an FEC code, or a combination thereof.

Training an autoencoder may involve determining weights for the NNs (e.g., an NN-based encoder 325 and an NN-based decoder 330). For example, each NN may include an input layer, one or more hidden layers, and an output layer. In a fully connected NN with one hidden layer, each hidden layer node may receive a value from each input layer node as input, where each input is weighted. These NN weights may be based on a cost function that is revised during training of the NN. Similarly, each output layer node may receive a value from each hidden layer node as input, where the inputs are weighted. It is to be understood that an NN may include any number of hidden layers and any number of nodes in each layer. If training of the NN is complete, the NN may be represented using matrix operations according to the input values and the determined weights. If post-deployment training (e.g., online training) is supported at a device, the device may allocate memory to store errors and/or gradients for reverse matrix multiplication. These errors and/or gradients may support updating the NN based on output feedback. Training the NN may support computation of the weights (e.g., connecting the input layer nodes to hidden layer nodes, hidden layer nodes to other hidden layer nodes, hidden layer nodes to the output layer nodes, or some combination thereof) to map an input pattern to a desired output outcome. In some examples, an NN of an autoencoder may be an example of a feed forward (FF) or deep feed forward (DFF) neural network, a recurrent neural network (RNN), a long/short term memory (LSTM) neural network, or any other type of neural network.

Multiple autoencoders (e.g., including an NN-based encoder 325 and a corresponding NN-based decoder 330) may be trained differently, stored differently, or both for different messaging sizes. For example, an autoencoder may be trained for messages 320 of a specific size or range of sizes, and the autoencoder may perform relatively poorly for messages 320 of other sizes. A message's size may be related to the payload size of the message 320, the encoded size of the message 320, or both. For example, the message's size may correspond to the TB size for the message 320, a number of REs, PRBs, or OFDM symbols allocated for transmitting the message 320, a total set of resources allocated for transmitting the message 320, a number of coded bits for transmitting the message 320, or some combination thereof. In some cases, reusing an NN, such as an NN-based encoder 325 or NN-based decoder 330, trained for small packet sizes (e.g., TB sizes below a threshold TB size) to modulate or demodulate a large packet (e.g., with a TB size above the threshold TB size) may exponentially increase the complexity involved in the modulation or demodulation process, resulting in processing inefficiencies. In some cases, for coherent transmissions, a device may use CSI measurements to help handle modulation or demodulation of a message 320 using an autoencoder regardless of the message size. For example, the device may use channel estimation results for demodulation, supporting the modulation and demodulation of relatively short sequences or symbols. In some such examples, the device may use an autoencoder for symbol-wise modulation and/or demodulation. However, for non-coherent transmissions, the CSI measurements may be unavailable. In some such examples, the device may use relatively long sequences (e.g., greater than a threshold number of symbols) for modulation and/or demodulation of non-coherent transmissions and may implement multiple autoencoders to handle different sequence lengths.

As described herein, devices supporting the autoencoder configuration 300 may determine which NN-based encoder 325 to use for communications based on a size parameter of a message 320. For example, based on the indicated size parameter for communicating the message 320, the encoder 310 may select NN-based encoder 325-c to efficiently modulate the message 320. The decoder 315 may select NN-based decoder 330-b based on the indicated size parameter, the determined NN-based encoder 325-c, or both to efficiently reconstruct the modulated message 320.

FIG. 4 illustrates an example of a segmented autoencoder configuration 400 that supports size-based NN selection for autoencoder-based communication in accordance with aspects of the present disclosure. In some examples, the segmented autoencoder configuration 400 may implement aspects of a wireless communications system 100 or 200, an autoencoder configuration 300, or a combination thereof. For example, a UE 115 or base station 105, as described with reference to FIGS. 1 and 2, may implement the segmented autoencoder configuration 400 to improve spectral efficiency and processing overhead. In some examples, a UE 115, base station 105, or both may use the segmented autoencoder configuration 400 to handle encoding, modulation, decoding, demodulation, or some combination thereof for relatively large messages (e.g., messages with size parameters exceeding a size parameter threshold).

In some examples, a wireless device, such as a base station 105 or a UE 115, may implement autoencoder-based communications for a set of allocated resources (e.g., the allocated resource set 405). In some cases, a grant (e.g., a dynamic uplink grant, a configured grant, a dynamic downlink grant, an SPS configuration) may allocate the resource set 405 for communication of a message. In some examples, a size parameter (e.g., a TB size) of the message may exceed a size threshold. The wireless devices communicating the message may determine to segment the allocated resource set 405 into multiple segments 410 for encoding and decoding. In some examples, such a determination may be based on the size parameter satisfying the size threshold. The wireless devices may determine the same or different NN-based encoders, NN-based decoders, or both for the different segments 410 of the allocated resource set 405. In some examples, segmenting the allocated resource set 405 and using multiple NN-based encoders and NN-based decoders may reduce the encoding and decoding complexity for a message (e.g., as compared to using a single NN-based encoder and a single NN-based decoder for the full allocated resource set 405).

A wireless device (e.g., a UE 115 or base station 105) may determine the segments 410 (e.g., segments 410-a, 410-b, 410-c, and 410-d) for the allocated resource set 405 based on one or more parameters. For example, the wireless device may determine the segments 410 based on the REs for the allocated resource set 405, the PRBs for the allocated resource set 405, the sub-band(s) for the allocated resource set 405, the OFDM symbols or OFDM symbols groups for the allocated resource set 405, the REs for the segments 410, the PRBs for the segments 410, the sub-band(s) for the segments 410, the OFDM symbols or OFDM symbol groups for the segments 410, or any combination thereof. Determining the segments 410 may involve determining a number of segments 410, determining a size of each segment 410, determining a resource allocation for each segment 410, or a combination thereof. The segments 410 may be frequency-division multiplexed (FDMed) in the allocated resource set 405, time-division multiplexed (TDMed) in the allocated resource set 405, or some combination thereof. Additionally or alternatively, a wireless device may be configured with one or more segmentation rules for determining the segments 410 based on one or more other parameters (e.g., the wireless device may be configured with a number of segments 410 to create, a maximum segment size, a minimum segment size, or any other segmentation parameter).

In some examples, the wireless device may determine a respective NN-based encoder 415 for each segment 410 based on a respective size parameter for the segment 410. For example, the wireless device may determine NN-based encoder 415-*a* for segment 410-*a*, NN-based encoder 415-*b* for segment 410-*b*, NN-based encoder 415-*c* for segment 410-*c*, and NN-based encoder 415-*d* for segment 410-*d*. The wireless device may determine different NN-based encoders 415 for different segments 410, the same NN-based encoder 415 for different segments 410, or a combination thereof. The wireless device may determine NN-based encoder 415-*a* for segment 410-*a* based on a respective size parameter for segment 410-*a* (e.g., a number of REs for segment 410-*a*, a number of PRBs for segment 410-*a*, a number of OFDM symbols for segment 410-*a*, a total number of resources for segment 410-*a*, or some combination thereof), rather than a size parameter for the full allocated resource set 405. Additionally or alternatively, a wireless device may determine a respective NN-based decoder 420 (e.g., NN-based decoders 420-*a*, 420-*b*, 420-*c*, and 420-*d*) corresponding to the determined respective NN-based encoder 415 for each segment 410. For example, the wireless device may determine NN-based decoder 420-*a* for segment 410-*a* corresponding to NN-based encoder 415-*a*, while the wireless device may determine NN-based decoder 420-*b* for segment 410-*b* corresponding to NN-based encoder 415-*b*. As with the NN-based encoders 415, the wireless device may determine different NN-based decoders 420 for different segments 410, the same NN-based decoder 420 for different segments 410, or a combination thereof. The NN-based encoder selection, the NN-based decoder selection, or both may be based on any techniques described herein (e.g., techniques described with reference to FIGS. 2 and 3).

The wireless device may communicate a message in the allocated resource set 405 based on the determined respective NN-based encoder 415 for each segment 410 of the set of multiple segments 410. In some cases, the wireless device may modulate at least a portion of the message onto resources in each segment 410 using the determined respective NN-based encoders 415 in order to transmit the message in the resource set 405. For example, rather than modulate a single, long sequence onto the allocated resource set 405 using a single NN-based encoder 415, the wireless device may modulate multiple shorter sequences onto multiple resource segments 410 using multiple respective NN-based encoders 415. A wireless device receiving the message may receive the message over the allocated resource set 405 and may demodulate each segment 410 of the set of multiple segments 410 using the determined respective NN-based decoders 420. For example, the receiving device may determine multiple sequences based on the multiple demodulation processes using the multiple respective NN-based decoders 420 and may aggregate the multiple sequences to determine the transmitted message.

FIG. 5 illustrates an example of a process flow 500 that supports size-based NN selection for autoencoder-based communication in accordance with aspects of the present disclosure. In some examples, the process flow 500 may implement aspects of a wireless communications system 100 or 200 as described with reference to FIGS. 1 and 2. The process flow 500 may include base station 105-*b* and UE 115-*b*, which may be examples of the corresponding devices as described herein. Alternative examples of the following may be implemented, where some steps are performed in a different order than described or are not performed at all. In some cases, steps may include additional features not mentioned below, or further steps may be added.

In some examples, at 505, base station 105-*b* may transmit, to UE 115-*b*, a configuration message indicating a set of multiple NN-based encoders and one or more size parameters corresponding to each NN-based encoder of the set of multiple NN-based encoders. In some other examples, UE 115-*b* may be pre-configured with the set of multiple NN-based encoders and the one or more size parameters corresponding to each NN-based encoder of the set of multiple NN-based encoders.

At 510, base station 105-*b* may transmit, to UE 115-*b*, a grant indicating a size parameter for communicating a message. The grant may be an example of a dynamic uplink grant, a configured grant, a dynamic downlink grant, an SPS configuration, or a combination thereof. In some cases, the size parameter may correspond to a TB size for the message, a number of REs for transmitting the message, a number of PRBs for transmitting the message, a number of OFDM symbols for transmitting the message, a number of coded bits for transmitting the message, or a combination thereof.

At 515-*a* and 515-*b*, base station 105-*b* and UE 115-*b* may determine, from the set of multiple NN-based encoders configured for UE 115-*b*, an NN-based encoder corresponding to the size parameter. In some cases, base station 105-*b*, UE 115-*b*, or both may determine a subset of the set of multiple NN-based encoders corresponding to the size parameter and may determine the NN-based encoder from the subset of the set of multiple NN-based encoders based on an NN-based encoder index indicated by the grant. In some other cases, base station 105-*b*, UE 115-*b*, or both may determine the NN-based encoder from the subset of the set of multiple NN-based encoders based on a transmission parameter. The transmission parameter my include a bandwidth indicator, a modulation scheme, a channel coding rate, or a combination thereof.

At 520-*a* or 520-*b*, the base station 105-*b* or UE 115-*b* may determine an NN-based decoder corresponding to the determined NN-based encoder. In some cases, the NN-based decoder may be determined based on an NN-based decoder index indicated by the grant.

At 525, base station 105-*b* and UE 115-*b* may communicate with each other according to the grant and based on the determined NN-based encoder. If the grant grants resources for an uplink transmission, UE 115-*b* may determine an NN-based encoder at 515-*b*, and base station 105-*b* may determine an NN-based decoder at 520-*a*. UE 115-*b* may modulate the message using the determined NN-based encoder and may transmit the message to base station 105-*b* (e.g., on the uplink). Base station 105-*b* may receive the modulated message and may demodulate the message using the determined NN-based decoder. If the grant grants resources for a downlink transmission, base station 105-*b* may determine the NN-based encoder at 515-*a*, and UE 115-*b* may determine the NN-based decoder at 520-*b*. Base station 105-*b* may modulate the message using the determined NN-based encoder and may transmit the message to UE 115-*b* (e.g., on the downlink). UE 115-*b* may receive the modulated message and may demodulate the message using the determined NN-based decoder. In some cases, the message may be communicated in a non-coherent transmission, where the non-coherent transmission includes the message and no reference signals associated with the message for channel estimation.

FIG. 6 illustrates an example of a process flow 600 that supports size-based NN selection for autoencoder-based communication in accordance with aspects of the present disclosure. In some examples, the process flow 600 may implement aspects of a wireless communications system 100 or 200 as described with reference to FIGS. 1 and 2. The process flow 600 may include base station 105-*c* and UE 115-*c*, which may be examples of corresponding devices as described herein. Alternative examples of the following may be implemented, where some steps are performed in a different order than described or are not performed at all. In some cases, steps may include additional features not mentioned below, or further steps may be added.

In some cases, at 605-*a* and 605-*b*, base station 105-*c* and UE 115-*c* may determine that a size parameter for a message to be communicated between base station 105-*c* and UE 115-*c*, such as the TB size, satisfies a threshold size.

At 610-*a* and 610-*b*, base station 105-*c* and UE 115-*c* may determine a set of multiple segments for a set of resources allocated for communicating the message. In some cases, the set of multiple segments may be determined based on the TB size for the message satisfying the threshold size. In some examples, the set of multiple segments may be determined based on one or more REs of the set of resources, one or more PRBs of the set of resources, one or more sub-bands of the set of resources, one or more OFDM symbols of the set of resources, one or more OFDM symbol groups of the set of resources, or a combination thereof.

At 615-*a* and 615-*b*, base station 105-*c* and UE 115-*c* may determine, for each segment of the set of multiple segments, a respective NN-based encoder based on a respective size parameter for each segment. In some cases, the respective size parameter for a segment of the set of multiple segments may correspond to a number of REs for the segment, a number of PRBs for the segment, a number of OFDM symbols for the segment, a number of coded bits for the segment, or a combination thereof. In some examples, a first NN-based encoder for a first segment of the set of multiple segments may be the same or different from a second NN-based encoder for a second segment of the set of multiple segments.

At 620-*a* or 620-*b*, base station 105-*c* or UE 115-*c* may determine, for each segment of the set of multiple segments, a respective NN-based decoder corresponding to the determined respective NN-based encoder for each segment of the set of multiple segments.

At 625, base station 105-*c* and UE 115-*c* may communicate the message in the set of resources based on the determined respective NN-based encoder for each segment of the set of multiple segments. If UE 115-*c* is transmitting the message to base station 105-*c*, UE 115-*c* may modulate the message in each segment of the set of multiple segments using the determined respective NN-based encoder for each segment of the set of multiple segments. Base station 105-*c* may receive the modulated message and may demodulate the message in each segment of the set of multiple segments using the determined respective NN-based decoder for each segment of the set of multiple segments. If base station 105-*c* is transmitting the message to UE 115-*c*, base station 105-*c* may modulate the message in each segment of the set of multiple segments using the determined respective NN-based encoder for each segment of the set of multiple segments. UE 115-*c* may receive the modulated message and may demodulate the message in each segment of the set of multiple segments using the determined respective NN-based decoder for each segment of the set of multiple segments. In some cases, the message may be communicated in a non-coherent transmission, where the non-coherent transmission includes the message and no reference signals associated with the message for channel estimation.

FIG. 7 shows a block diagram 700 of a device 705 that supports size-based NN selection for autoencoder-based communication in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to size-based NN selection for autoencoder-based communication). Information may be passed on to other components of the device 705. The receiver 710 may utilize a single antenna or multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to size-based NN selection for autoencoder-based communication). In some examples, the transmitter 715 may be co-located with a receiver 710 in a transceiver module. The transmitter 715 may utilize a single antenna or multiple antennas.

The communications manager 720, the receiver 710, the transmitter 715, or various combinations thereof or various components thereof may be examples of means for performing various aspects of size-based NN selection for autoencoder-based communication as described herein.

In some examples, the communications manager 720, the receiver 710, the transmitter 715, or various combinations thereof or components thereof may be implemented in hardware (e.g., in communications management circuitry). The circuitry may include a processor, a digital signal processor (DSP), an application specific integrated circuit (ASIC), a field programmable gate array (FPGA) or other programmable logic device, a discrete gate or transistor logic, discrete hardware components, or any combination thereof designed to perform the functions described in the present disclosure.

Additionally or alternatively, in some examples, the communications manager 720, the receiver 710, the transmitter 715, or various combinations thereof or components thereof may be implemented in code (e.g., as communications management software or firmware) executed by a processor. If implemented in code executed by a processor, the functions of the communications manager 720, the receiver 710, the transmitter 715, or various combinations thereof or components thereof may be executed by a general-purpose processor, a DSP, a central processing unit (CPU), an ASIC, an FPGA, or any combination of these or other programmable logic devices.

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured to provide or support a means for receiving, from a base station, a grant indicating a size parameter for communicating a message. The communications manager 720 may be configured to provide or support a means for determining, from a set of multiple NN-based encoders configured at the UE, an NN-based encoder corresponding to the size parameter. The communications manager 720 may be configured to provide or support a means for communicating the message with the base station according to the grant and based on the determined NN-based encoder.

Additionally or alternatively, the communications manager 720 may support wireless communications in accordance with examples as disclosed herein. For example, the communications manager 720 may be configured to provide or support a means for determining a set of multiple segments for a set of resources allocated for communicating a message. The communications manager 720 may be configured to provide or support a means for determining, for each segment of the set of multiple segments, a respective NN-based encoder based on a respective size parameter for each segment. The communications manager 720 may be configured to provide or support a means for communicating the message in the set of resources based on the determined respective NN-based encoder for each segment of the set of multiple segments.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reducing processing resources involved in communications. For example, by determining an NN-based encoder—and, correspondingly, an NN-based decoder—based on a size parameter, the device 705 may reduce the processing complexity and overhead involved in demodulating a message. Furthermore, the techniques described herein may support reliably decoding non-coherent transmissions. Improving the decoding reliability (e.g., for non-coherent transmissions) may reduce a number of retransmissions performed over the channel, potentially reducing a number of times the processor ramps up processing power and turns on processing units to handle communications. Additionally or alternatively, segmenting the allocated resources and determining respective NN-based encoders and decoders for the different segments may reduce the processing complexity involved in modulating and demodulating signals, effectively reducing the processing overhead at the device 705.

FIG. 8 shows a block diagram 800 of a device 805 that supports size-based NN selection for autoencoder-based communication in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to size-based NN selection for autoencoder-based communication). Information may be passed on to other components of the device 805. The receiver 810 may utilize a single antenna or multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to size-based NN selection for autoencoder-based communication). In some examples, the transmitter 815 may be co-located with a receiver 810 in a transceiver module. The transmitter 815 may utilize a single antenna or multiple antennas.

The device 805, or various components thereof, may be an example of means for performing various aspects of size-based NN selection for autoencoder-based communication as described herein. For example, the communications manager 820 may include a grant reception component 825, an NN-based encoder determination component 830, a communication component 835, a segmentation component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The grant reception component 825 may be configured to provide or support a means for receiving, from a base station, a grant indicating a size parameter for communicating a message. The NN-based encoder determination component 830 may be configured to provide or support a means for determining, from a set of multiple NN-based encoders configured at the UE, an NN-based encoder corresponding to the size parameter. The communication component 835 may be configured to provide or support a means for communicating the message with the base station according to the grant and based on the determined NN-based encoder.

Additionally or alternatively, the communications manager 820 may support wireless communications in accordance with examples as disclosed herein. For example, the segmentation component 840 may be configured to provide or support a means for determining a set of multiple segments for a set of resources allocated for communicating a message. The NN-based encoder determination component 830 may be configured to provide or support a means for determining, for each segment of the set of multiple segments, a respective NN-based encoder based on a respective size parameter for each segment. The communication component 835 may be configured to provide or support a means for communicating the message in the set of resources based on the determined respective NN-based encoder for each segment of the set of multiple segments.

FIG. 9 shows a block diagram 900 of a communications manager 920 that supports size-based NN selection for autoencoder-based communication in accordance with aspects of the present disclosure. The communications manager 920 may be an example of aspects of a communications manager 720, a communications manager 820, or both, as described herein. The communications manager 920, or various components thereof, may be an example of means for performing various aspects of size-based NN selection for autoencoder-based communication as described herein. For example, the communications manager 920 may include a grant reception component 925, an NN-based encoder determination component 930, a communication component 935, a segmentation component 940, a configuration component 945, a modulator 950, an NN-based decoder determination component 955, a TB size threshold component 960, a demodulator 965, or any combination thereof. Each of these components may communicate, directly or indirectly, with one another (e.g., via one or more buses).

The communications manager 920 may support wireless communications at a UE in accordance with examples as disclosed herein. The grant reception component 925 may be configured to provide or support a means for receiving, from a base station, a grant indicating a size parameter for communicating a message. The NN-based encoder determination component 930 may be configured to provide or support a means for determining, from a set of multiple NN-based encoders configured at the UE, an NN-based encoder corresponding to the size parameter. The communication component 935 may be configured to provide or support a means for communicating the message with the base station according to the grant and based on the determined NN-based encoder.

In some examples, to support the communicating, the communication component 935 may be configured to provide or support a means for communicating the message in a non-coherent transmission, the non-coherent transmission including the message and no reference signals associated with the message for channel estimation.

In some examples, to support the determining, the NN-based encoder determination component 930 may be configured to provide or support a means for determining a subset of the set of multiple NN-based encoders corresponding to the size parameter. In some examples, to support the determining, the NN-based encoder determination component 930 may be configured to provide or support a means for determining the NN-based encoder from the subset of the set of multiple NN-based encoders based on an NN-based encoder index indicated by the grant.

In some examples, to support the determining, the NN-based encoder determination component 930 may be configured to provide or support a means for determining a subset of the set of multiple NN-based encoders corresponding to the size parameter. In some examples, to support the determining, the NN-based encoder determination component 930 may be configured to provide or support a means for determining the NN-based encoder from the subset of the set of multiple NN-based encoders based on a transmission parameter.

In some examples, the transmission parameter includes a bandwidth indicator, a modulation scheme, a channel coding rate, or a combination thereof.

In some examples, the configuration component 945 may be configured to provide or support a means for receiving, from the base station, a configuration message indicating the set of multiple NN-based encoders and one or more size parameters corresponding to each NN-based encoder of the set of multiple NN-based encoders.

In some examples, the UE is pre-configured with the set of multiple NN-based encoders and one or more size parameters corresponding to each NN-based encoder of the set of multiple NN-based encoders.

In some examples, the size parameter corresponds to a TB size for the message, a number of REs for transmitting the message, a number of PRBs for transmitting the message, a number of OFDM symbols for transmitting the message, a number of coded bits for transmitting the message, or a combination thereof.

In some examples, to support the communicating, the modulator 950 may be configured to provide or support a means for modulating the message using the determined NN-based encoder. In some examples, to support the communicating, the communication component 935 may be configured to provide or support a means for transmitting, to the base station, the modulated message.

In some examples, the NN-based decoder determination component 955 may be configured to provide or support a means for determining an NN-based decoder corresponding to the determined NN-based encoder. In some examples, to support the communicating, the communication component 935 may be configured to provide or support a means for receiving, from the base station, the message, and the demodulator 965 may be configured to provide or support a means for demodulating the message using the determined NN-based decoder.

In some examples, the NN-based decoder is determined based on an NN-based decoder index indicated by the grant.

In some examples, the grant includes a dynamic uplink grant, a configured grant, a dynamic downlink grant, an SPS configuration, or a combination thereof.

Additionally or alternatively, the communications manager 920 may support wireless communications in accordance with examples as disclosed herein. The segmentation component 940 may be configured to provide or support a means for determining a set of multiple segments for a set of resources allocated for communicating a message. The NN-based encoder determination component 930 may be configured to provide or support a means for determining, for each segment of the set of multiple segments, a respective NN-based encoder based on a respective size parameter for each segment. The communication component 935 may be configured to provide or support a means for communicating the message in the set of resources based on the determined respective NN-based encoder for each segment of the set of multiple segments.

In some examples, the TB size threshold component 960 may be configured to provide or support a means for determining that a TB size for the message satisfies a threshold size, where the set of multiple segments is determined based on the TB size for the message satisfying the threshold size.

In some examples, to support the communicating, the modulator 950 may be configured to provide or support a means for modulating the message in each segment of the set of multiple segments using the determined respective NN-based encoder for each segment of the set of multiple segments. In some examples, to support the communicating, the communication component 935 may be configured to provide or support a means for transmitting the modulated message.

In some examples, the NN-based decoder determination component 955 may be configured to provide or support a means for determining, for each segment of the set of multiple segments, a respective NN-based decoder corresponding to the determined respective NN-based encoder for each segment of the set of multiple segments. In some examples, to support the communicating, the communication component 935 may be configured to provide or support a means for receiving the message, and the demodulator 965 may be configured to provide or support a means for demodulating the message in each segment of the set of multiple segments using the determined respective NN-based decoder for each segment of the set of multiple segments.

In some examples, the set of multiple segments is determined based on one or more REs of the set of resources, one or more PRBs of the set of resources, one or more subbands of the set of resources, one or more OFDM symbols of the set of resources, one or more OFDM symbol groups of the set of resources, or a combination thereof.

In some examples, the respective size parameter for a segment of the set of multiple segments corresponds to a number of REs for the segment, a number of PRBs for the segment, a number of OFDM symbols for the segment, a number of coded bits for the segment, or a combination thereof.

In some examples, a first NN-based encoder for a first segment of the set of multiple segments is different from a second NN-based encoder for a second segment of the set of multiple segments.

FIG. 10 shows a diagram of a system 1000 including a device 1005 that supports size-based NN selection for autoencoder-based communication in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, including a communications manager 1010, an I/O controller 1015, a transceiver 1020, an antenna 1025, memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In some other cases, the I/O controller 1015 may represent or interact with a modem, a keyboard, a mouse, a touchscreen, or a similar device. In some cases, the I/O controller 1015 may be implemented as part of a processor, such as the processor 1040. In some cases, a user may interact with the device 1005 via the I/O controller 1015 or via hardware components controlled by the I/O controller 1015.

In some cases, the device 1005 may include a single antenna 1025. However, in some other cases, the device 1005 may have more than one antenna 1025, which may be capable of concurrently transmitting or receiving multiple wireless transmissions. The transceiver 1020 may communicate bi-directionally, via the one or more antennas 1025, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to one or more antennas 1025 for transmission and to demodulate packets received from the one or more antennas 1025. The transceiver 1020, or the transceiver 1020 and one or more antennas 1025, may be an example of a transmitter 715, a transmitter 815, a receiver 710, a receiver 810, or any combination thereof or component thereof as described herein.

The memory 1030 may include random-access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a nontransitory computer-readable medium such as system memory or other type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in memory (e.g., the memory 1030) to cause the device 1005 to perform various functions (e.g., functions or tasks supporting size-based NN selection for autoencoder-based communication). For example, the device 1005 or a component of the device 1005 may include a processor 1040 and memory 1030 coupled to the processor 1040, the processor 1040 and memory 1030 configured to perform various functions described herein.

The communications manager 1010 may support wireless communications at a UE in accordance with examples as disclosed herein. For example, the communications manager 1010 may be configured to provide or support a means for receiving, from a base station, a grant indicating a size parameter for communicating a message. The communications manager 1010 may be configured to provide or support a means for determining, from a set of multiple NN-based encoders configured at the UE, an NN-based encoder corresponding to the size parameter. The communications manager 1010 may be configured to provide or support a means for communicating the message with the base station according to the grant and based on the determined NN-based encoder.

Additionally or alternatively, the communications manager 1010 may support wireless communications in accordance with examples as disclosed herein. For example, the communications manager 1010 may be configured to provide or support a means for determining a set of multiple segments for a set of resources allocated for communicating a message. The communications manager 1010 may be configured to provide or support a means for determining, for each segment of the set of multiple segments, a respective NN-based encoder based on a respective size parameter for each segment. The communications manager 1010 may be configured to provide or support a means for communicating the message in the set of resources based on the determined respective NN-based encoder for each segment of the set of multiple segments.

By including or configuring the communications manager 1010 in accordance with examples as described herein, the device 1005 may realize one or more potential advantages. In some examples, determining the NN-based encoder based on the size parameter may support the device 1005 implementing multiple NN-based encoders trained for different message sizes. As such, the dynamic selection of an NN-based encoder based on the size parameter may support improved encoding performance, modulation performance, or both. Similarly, selecting an NN-based decoder based on the determined NN-based encoder may support improved decoding performance, demodulation performance, or both. By determining the NN-based encoder based on the size parameter, the device 1005 may reduce the processing complexity and overhead involved in demodulating a message. Furthermore, the techniques described herein may support reliably decoding non-coherent transmissions, allowing for reduced channel overhead (e.g., as compared to transmissions including reference signals for channel estimation). Additionally or alternatively, segmenting the allocated resources and determining respective NN-based encoders and decoders for the different segments may reduce the complexity involved in modulating and demodulating signals.

In some examples, the communications manager 1010 may be configured to perform various operations (e.g., receiving, monitoring, transmitting) using or otherwise in cooperation with the transceiver 1020, the one or more antennas 1025, or any combination thereof. Although the communications manager 1010 is illustrated as a separate component, in some examples, one or more functions described with reference to the communications manager 1010 may be supported by or performed by the processor 1040, the memory 1030, the code 1035, or any combination thereof. For example, the code 1035 may include instructions executable by the processor 1040 to cause the device 1005 to perform various aspects of size-based NN selection for autoencoder-based communication as described herein, or the processor 1040 and the memory 1030 may be otherwise configured to perform or support such operations.

FIG. 11 shows a block diagram 1100 of a device 1105 that supports size-based NN selection for autoencoder-based communication in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to size-based NN selection for autoencoder-based communication). Information may be passed on to other components of the device 1105. The receiver 1110 may utilize a single antenna or multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to size-based NN selection for autoencoder-based communication). In some examples, the transmitter 1115 may be co-located with a receiver 1110 in a transceiver module. The transmitter 1115 may utilize a single antenna or multiple antennas.

The communications manager 1120, the receiver 1110, the transmitter 1115, or various combinations thereof or various components thereof may be examples of means for performing various aspects of size-based NN selection for autoencoder-based communication as described herein.

In some examples, the communications manager 1120, the receiver 1110, the transmitter 1115, or various combinations thereof or components thereof may be implemented in hardware (e.g., in communications management circuitry). The circuitry may include a processor, a DSP, an ASIC, an FPGA or other programmable logic device, a discrete gate or transistor logic, discrete hardware components, or any combination thereof designed to perform the functions described in the present disclosure.

Additionally or alternatively, in some examples, the communications manager 1120, the receiver 1110, the transmitter 1115, or various combinations thereof or components thereof may be implemented in code (e.g., as communications management software or firmware) executed by a processor. If implemented in code executed by a processor, the functions of the communications manager 1120, the receiver 1110, the transmitter 1115, or various combinations thereof or components thereof may be executed by a general-purpose processor, a DSP, a CPU, an ASIC, an FPGA, or any combination of these or other programmable logic devices.

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured to provide or support a means for transmitting, to a UE, a grant indicating a size parameter for communicating a message. The communications manager 1120 may be configured to provide or support a means for determining, from a set of multiple NN-based encoders configured for the UE, an NN-based encoder corresponding to the size parameter. The communications manager 1120 may be configured to provide or support a means for communicating the message with the UE according to the grant and based on the determined NN-based encoder.

Additionally or alternatively, the communications manager 1120 may support wireless communications in accordance with examples as disclosed herein. For example, the communications manager 1120 may be configured to provide or support a means for determining a set of multiple segments for a set of resources allocated for communicating a message. The communications manager 1120 may be configured to provide or support a means for determining, for each segment of the set of multiple segments, a respective NN-based encoder based on a respective size parameter for each segment. The communications manager 1120 may be configured to provide or support a means for communicating the message in the set of resources based on the determined respective NN-based encoder for each segment of the set of multiple segments.

FIG. 12 shows a block diagram 1200 of a device 1205 that supports size-based neural network selection for autoencoder-based communication in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to size-based NN selection for autoencoder-based communication). Information may be passed on to other components of the device 1205. The receiver 1210 may utilize a single antenna or multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to size-based neural network selection for autoencoder-based communication). In some examples, the transmitter 1215 may be co-located with a receiver 1210 in a transceiver module. The transmitter 1215 may utilize a single antenna or multiple antennas.

The device 1205, or various components thereof, may be an example of means for performing various aspects of size-based NN selection for autoencoder-based communication as described herein. For example, the communications manager 1220 may include a grant transmission component 1225, an NN-based encoder determination component 1230, a communication component 1235, a segmentation component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The grant transmission component 1225 may be configured to provide or support a means for transmitting, to a UE, a grant indicating a size parameter for communicating a message. The NN-based encoder determination component 1230 may be configured to provide or support a means for determining, from a set of multiple NN-based encoders configured for the UE, an NN-based encoder corresponding to the size parameter. The communication component 1235 may be configured to provide or support a means for communicating the message with the UE according to the grant and based on the determined NN-based encoder.

Additionally or alternatively, the communications manager 1220 may support wireless communications in accordance with examples as disclosed herein. The segmentation component 1240 may be configured to provide or support a means for determining a set of multiple segments for a set of resources allocated for communicating a message. The NN-based encoder determination component 1230 may be configured to provide or support a means for determining, for each segment of the set of multiple segments, a respective NN-based encoder based on a respective size parameter for each segment. The communication component 1235 may be configured to provide or support a means for communicating the message in the set of resources based on the determined respective NN-based encoder for each segment of the set of multiple segments.

FIG. 13 shows a block diagram 1300 of a communications manager 1320 that supports size-based NN selection for autoencoder-based communication in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of size-based NN selection for autoencoder-based communication as described herein. For example, the communications manager 1320 may include a grant transmission component 1325, an NN-based encoder determination component 1330, a communication component 1335, a segmentation component 1340, a configuration component 1345, a modulator 1350, an NN-based decoder determination component 1355, a TB size threshold component 1360, a demodulator 1365, or any combination thereof. Each of these components may communicate, directly or indirectly, with one another (e.g., via one or more buses).

The communications manager 1320 may support wireless communications at a base station in accordance with examples as disclosed herein. The grant transmission component 1325 may be configured to provide or support a means for transmitting, to a UE, a grant indicating a size parameter for communicating a message. The NN-based encoder determination component 1330 may be configured to provide or support a means for determining, from a set of multiple NN-based encoders configured for the UE, an NN-based encoder corresponding to the size parameter. The communication component 1335 may be configured to provide or support a means for communicating the message with the UE according to the grant and based on the determined NN-based encoder.

In some examples, to support the communicating, the communication component 1335 may be configured to provide or support a means for communicating the message in a non-coherent transmission, the non-coherent transmission including the message and no reference signals associated with the message for channel estimation.

In some examples, to support the determining, the NN-based encoder determination component 1330 may be configured to provide or support a means for determining a subset of the set of multiple NN-based encoders corresponding to the size parameter. In some examples, to support the determining, the NN-based encoder determination component 1330 may be configured to provide or support a means for determining the NN-based encoder from the subset of the set of multiple NN-based encoders based on an NN-based encoder index indicated by the grant.

In some examples, to support the determining, the NN-based encoder determination component 1330 may be configured to provide or support a means for determining a subset of the set of multiple NN-based encoders corresponding to the size parameter. In some examples, to support the determining, the NN-based encoder determination component 1330 may be configured to provide or support a means for determining the NN-based encoder from the subset of the set of multiple NN-based encoders based on a transmission parameter.

In some examples, the transmission parameter includes a bandwidth indicator, a modulation scheme, a channel coding rate, or a combination thereof.

In some examples, the configuration component 1345 may be configured to provide or support a means for transmitting, to the UE, a configuration message indicating the set of multiple NN-based encoders and one or more size parameters corresponding to each NN-based encoder of the set of multiple NN-based encoders.

In some examples, the size parameter corresponds to a TB size for the message, a number of REs for transmitting the message, a number of PRBs for transmitting the message, a number of OFDM symbols for transmitting the message, a number of coded bits for transmitting the message, or a combination thereof.

In some examples, to support the communicating, the modulator 1350 may be configured to provide or support a means for modulating the message using the determined NN-based encoder. In some examples, to support the communicating, the communication component 1335 may be configured to provide or support a means for transmitting, to the UE, the modulated message.

In some examples, the NN-based decoder determination component 1355 may be configured to provide or support a means for determining an NN-based decoder corresponding to the determined NN-based encoder. In some examples, to support the communicating, the communication component 1335 may be configured to provide or support a means for receiving, from the UE, the message, and the demodulator 1365 may be configured to provide or support a means for demodulating the message using the determined NN-based decoder.

In some examples, the grant includes a dynamic uplink grant, a configured grant, a dynamic downlink grant, an SPS configuration, or a combination thereof.

Additionally or alternatively, the communications manager 1320 may support wireless communications in accordance with examples as disclosed herein. The segmentation component 1340 may be configured to provide or support a means for determining a set of multiple segments for a set of resources allocated for communicating a message. The NN-based encoder determination component 1330 may be configured to provide or support a means for determining, for each segment of the set of multiple segments, a respective NN-based encoder based on a respective size parameter for each segment. The communication component 1335 may be configured to provide or support a means for communicating the message in the set of resources based on the determined respective NN-based encoder for each segment of the set of multiple segments.

In some examples, the TB size threshold component 1360 may be configured to provide or support a means for determining that a TB size for the message satisfies a threshold size, where the set of multiple segments is determined based on the TB size for the message satisfying the threshold size.

In some examples, to support the communicating, the modulator 1350 may be configured to provide or support a means for modulating the message in each segment of the set of multiple segments using the determined respective NN-based encoder for each segment of the set of multiple segments. In some examples, to support the communicating, the communication component 1335 may be configured to provide or support a means for transmitting the modulated message.

In some examples, the NN-based decoder determination component 1355 may be configured to provide or support a means for determining, for each segment of the set of multiple segments, a respective NN-based decoder corresponding to the determined respective NN-based encoder for each segment of the set of multiple segments. In some examples, to support the communicating, the communication component 1335 may be configured to provide or support a means for receiving the message, and the demodulator 1365 may be configured to provide or support a means for demodulating the message in each segment of the set of multiple segments using the determined respective NN-based decoder for each segment of the set of multiple segments.

In some examples, the set of multiple segments is determined based on one or more REs of the set of resources, one or more PRBs of the set of resources, one or more subbands of the set of resources, one or more OFDM symbols of the set of resources, one or more OFDM symbol groups of the set of resources, or a combination thereof.

In some examples, the respective size parameter for a segment of the set of multiple segments corresponds to a number of REs for the segment, a number of PRBs for the segment, a number of OFDM symbols for the segment, a number of coded bits for the segment, or a combination thereof.

In some examples, a first NN-based encoder for a first segment of the set of multiple segments is different from a second NN-based encoder for a second segment of the set of multiple segments.

FIG. 14 shows a diagram of a system 1400 including a device 1405 that supports size-based NN selection for autoencoder-based communication in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, including a communications manager 1410, a network communications manager 1415, a transceiver 1420, an antenna 1425, memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1415 may manage communications with a core network 130 (e.g., via one or more wired backhaul links). For example, the network communications manager 1415 may manage the transfer of data communications for client devices, such as one or more UEs 115.

In some cases, the device 1405 may include a single antenna 1425. However, in some other cases, the device 1405 may have more than one antenna 1425, which may be capable of concurrently transmitting or receiving multiple wireless transmissions. The transceiver 1420 may communicate bi-directionally, via the one or more antennas 1425, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to one or more antennas 1425 for transmission and to demodulate packets received from the one or more antennas 1425. The transceiver 1420, or the transceiver 1420 and one or more antennas 1425, may be an example of a transmitter 1115, a transmitter 1215, a receiver 1110, a receiver 1210, or any combination thereof or component thereof as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in memory (e.g., the memory 1430) to cause the device 1405 to perform various functions (e.g., functions or tasks supporting size-based NN selection for autoencoder-based communication). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1410 may support wireless communications at a base station in accordance with examples as disclosed herein. For example, the communications manager 1410 may be configured to provide or support a means for transmitting, to a UE, a grant indicating a size parameter for communicating a message. The communications manager 1410 may be configured to provide or support a means for determining, from a set of multiple NN-based encoders configured for the UE, an NN-based encoder corresponding to the size parameter. The communications manager 1410 may be configured to provide or support a means for communicating the message with the UE according to the grant and based on the determined NN-based encoder.

Additionally or alternatively, the communications manager 1410 may support wireless communications in accordance with examples as disclosed herein. For example, the communications manager 1410 may be configured to provide or support a means for determining a set of multiple segments for a set of resources allocated for communicating a message. The communications manager 1410 may be configured to provide or support a means for determining, for each segment of the set of multiple segments, a respective NN-based encoder based on a respective size parameter for each segment. The communications manager 1410 may be configured to provide or support a means for communicating the message in the set of resources based on the determined respective NN-based encoder for each segment of the set of multiple segments.

In some examples, the communications manager 1410 may be configured to perform various operations (e.g., receiving, monitoring, transmitting) using or otherwise in cooperation with the transceiver 1420, the one or more antennas 1425, or any combination thereof. Although the communications manager 1410 is illustrated as a separate component, in some examples, one or more functions described with reference to the communications manager 1410 may be supported by or performed by the processor 1440, the memory 1430, the code 1435, or any combination thereof. For example, the code 1435 may include instructions executable by the processor 1440 to cause the device 1405 to perform various aspects of size-based NN selection for autoencoder-based communication as described herein, or the processor 1440 and the memory 1430 may be otherwise configured to perform or support such operations.

Figure 15:
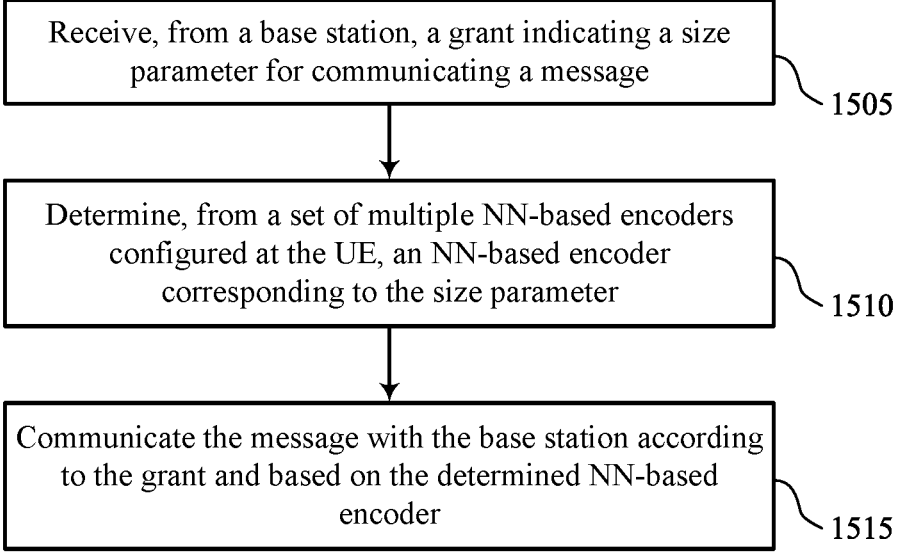

FIG. 15 shows a flowchart illustrating a method 1500 that supports size-based NN selection for autoencoder-based communication in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a grant indicating a size parameter for communicating a message. The operations of 1505 may be performed according to the methods described herein. In some examples, aspects of the operations of 1505 may be performed by a grant reception component 925 as described with reference to FIG. 9.

At 1510, the method may include determining, from a set of multiple NN-based encoders configured at the UE, an NN-based encoder corresponding to the size parameter. The operations of 1510 may be performed according to the methods described herein. In some examples, aspects of the operations of 1510 may be performed by an NN-based encoder determination component 930 as described with reference to FIG. 9.

At 1515, the method may include communicating the message with the base station according to the grant and based on the determined NN-based encoder. The operations of 1515 may be performed according to the methods described herein. In some examples, aspects of the operations of 1515 may be performed by a communication component 935 as described with reference to FIG. 9.

FIG. 16 shows a flowchart illustrating a method 1600 that supports size-based NN selection for autoencoder-based communication in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a grant indicating a size parameter for communicating a message. The operations of 1605 may be performed according to the methods described herein. In some examples, aspects of the operations of 1605 may be performed by a grant reception component 925 as described with reference to FIG. 9.

At 1610, the method may include determining, from a set of multiple NN-based encoders configured at the UE, an NN-based encoder corresponding to the size parameter. The operations of 1610 may be performed according to the methods described herein. In some examples, aspects of the operations of 1610 may be performed by an NN-based encoder determination component 930 as described with reference to FIG. 9.

At 1615, the method may include communicating the message with the base station according to the grant and based on the determined NN-based encoder. In some examples, the communicating may involve modulating the message using the determined NN-based encoder and transmitting, to the base station, the modulated message. The operations of 1615 may be performed according to the methods described herein. In some examples, aspects of the operations of 1615 may be performed by a communication component 935, a modulator 950, or a combination thereof as described with reference to FIG. 9.

FIG. 17 shows a flowchart illustrating a method 1700 that supports size-based NN selection for autoencoder-based communication in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a grant indicating a size parameter for communicating a message. The operations of 1705 may be performed according to the methods described herein. In some examples, aspects of the operations of 1705 may be performed by a grant reception component 925 as described with reference to FIG. 9.

At 1710, the method may include determining, from a set of multiple NN-based encoders configured at the UE, an NN-based encoder corresponding to the size parameter. The operations of 1710 may be performed according to the methods described herein. In some examples, aspects of the operations of 1710 may be performed by an NN-based encoder determination component 930 as described with reference to FIG. 9.

At 1715, the method may include determining an NN-based decoder corresponding to the determined NN-based encoder. The operations of 1715 may be performed according to the methods described herein. In some examples, aspects of the operations of 1715 may be performed by an NN-based decoder determination component 955 as described with reference to FIG. 9.

At 1720, the method may include communicating the message with the base station according to the grant and based on the determined NN-based encoder. In some examples, the communicating may involve receiving, from the base station, the message and demodulating the message using the determined NN-based decoder. The operations of 1720 may be performed according to the methods described herein. In some examples, aspects of the operations of 1720 may be performed by a communication component 935, a demodulator 965, or a combination thereof as described with reference to FIG. 9.

Figure 18:
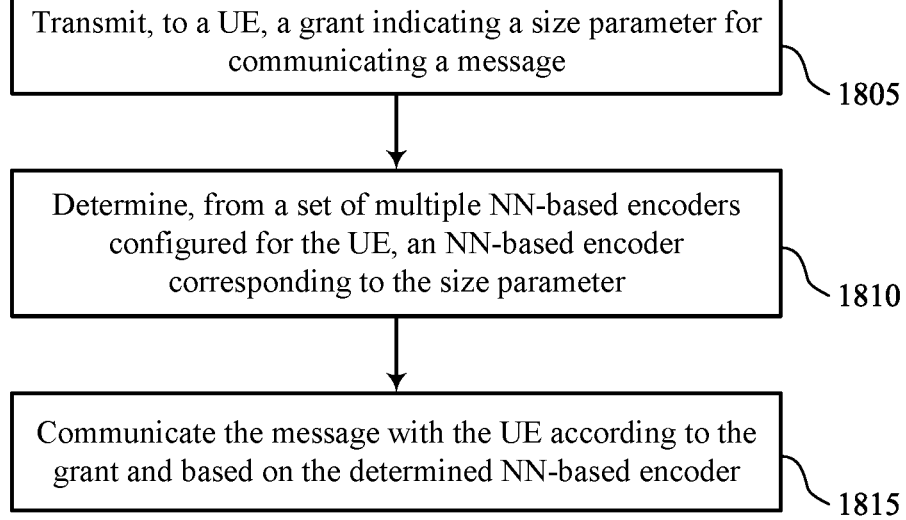

FIG. 18 shows a flowchart illustrating a method 1800 that supports size-based NN selection for autoencoder-based communication in accordance with aspects of the present disclosure. The operations of the method 1800 may be implemented by a base station or its components as described herein. For example, the operations of the method 1800 may be performed by a base station 105 as described with reference to FIGS. 1 through 5 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a grant indicating a size parameter for communicating a message. The operations of 1805 may be performed according to the methods described herein. In some examples, aspects of the operations of 1805 may be performed by a grant transmission component 1325 as described with reference to FIG. 13.

At 1810, the method may include determining, from a set of multiple NN-based encoders configured for the UE, an NN-based encoder corresponding to the size parameter. The operations of 1810 may be performed according to the methods described herein. In some examples, aspects of the operations of 1810 may be performed by an NN-based encoder determination component 1330 as described with reference to FIG. 13.

At 1815, the method may include communicating the message with the UE according to the grant and based on the determined NN-based encoder. The operations of 1815 may be performed according to the methods described herein. In some examples, aspects of the operations of 1815 may be performed by a communication component 1335 as described with reference to FIG. 13.

FIG. 19 shows a flowchart illustrating a method 1900 that supports size-based NN selection for autoencoder-based communication in accordance with aspects of the present disclosure. The operations of the method 1900 may be implemented by a UE or its components or a base station or its components as described herein. For example, the operations of the method 1900 may be performed by a UE 115 as described with reference to FIGS. 1 through 10 or a base station 105 as described with reference to FIGS. 1 through 5 and 11 through 14. In some examples, a UE or a base station may execute a set of instructions to control the functional elements of the UE or the base station to perform the described functions. Additionally or alternatively, the UE or the base station may perform aspects of the described functions using special-purpose hardware.

At 1905, the method may include determining a set of multiple segments for a set of resources allocated for communicating a message. The operations of 1905 may be performed according to the methods described herein. In some examples, aspects of the operations of 1905 may be performed by a segmentation component 940 or a segmentation component 1340 as described with reference to FIGS. 9 and 13.

At 1910, the method may include determining, for each segment of the set of multiple segments, a respective NN-based encoder based on a respective size parameter for each segment. The operations of 1910 may be performed according to the methods described herein. In some examples, aspects of the operations of 1910 may be performed by an NN-based encoder determination component 930 or an NN-based encoder determination component 1330 as described with reference to FIGS. 9 and 13.

At 1915, the method may include communicating the message in the set of resources based on the determined respective NN-based encoder for each segment of the set of multiple segments. The operations of 1915 may be performed according to the methods described herein. In some examples, aspects of the operations of 1915 may be performed by a communication component 935 or a communication component 1335 as described with reference to FIGS. 9 and 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
  receiving, from a network device, a grant indicating a size parameter for communicating a message;
  determining, from a subset of a plurality of neural network-based encoders configured at the UE, a neural network-based encoder based at least in part on a neural network-based encoder index indicated by the grant, a transmission parameter, or both, the subset of the plurality of neural network-based encoders corresponding to the size parameter; and
  communicating the message with the network device according to the grant and based at least in part on the determined neural network-based encoder.

2. The method of claim 1, wherein the communicating comprises:
  communicating the message in a non-coherent transmission, the non-coherent transmission comprising the message and no reference signals associated with the message for channel estimation.

3. The method of claim 1, further comprising:
  determining the subset of the plurality of neural network-based encoders corresponding to the size parameter.

4. The method of claim 1, further comprising:
  determining the subset of the plurality of neural network-based encoders corresponding to the size parameter.

5. The method of claim 4, wherein the transmission parameter comprises a bandwidth indicator, a modulation scheme, a channel coding rate, or a combination thereof.

6. The method of claim 1, further comprising:
  receiving, from the network device, a configuration message indicating the plurality of neural network-based encoders and one or more size parameters corresponding to each neural network-based encoder of the plurality of neural network-based encoders.

7. The method of claim 1, wherein the UE is pre-configured with the plurality of neural network-based encoders and one or more size parameters corresponding to each neural network-based encoder of the plurality of neural network-based encoders.

8. The method of claim 1, wherein the size parameter corresponds to a transport block size for the message, a number of resource elements for transmitting the message, a number of physical resource blocks for transmitting the message, a number of orthogonal frequency domain multiplexing symbols for transmitting the message, a number of coded bits for transmitting the message, or a combination thereof.

9. The method of claim 1, wherein the communicating comprises:
  modulating the message using the determined neural network-based encoder; and
  transmitting, to the network device, the modulated message.

10. The method of claim 1, further comprising:
  determining a neural network-based decoder corresponding to the determined neural network-based encoder, wherein the communicating comprises:
  receiving, from the network device, the message; and
  demodulating the message using the determined neural network-based decoder.

11. The method of claim 10, wherein the neural network-based decoder is determined based at least in part on a neural network-based decoder index indicated by the grant.

12. The method of claim 1, wherein the grant comprises a dynamic uplink grant, a configured grant, a dynamic downlink grant, a semi-persistent scheduling configuration, or a combination thereof.

13. A method for wireless communications, comprising:
  determining a plurality of segments for a set of resources allocated for communicating a message;
  determining, for each segment of the plurality of segments, a respective neural network-based encoder from a respective subset of a plurality of neural network-based encoders based at least in part on a neural network-based encoder index, a transmission parameter, or both, the respective subset of the plurality of neural network-based encoders corresponding to a respective size parameter for each segment, wherein a first neural network-based encoder determined for a first segment of the plurality of segments is different from a second neural network-based encoder determined for a second segment of the plurality of segments; and
  communicating the message in the set of resources based at least in part on the determined respective neural network-based encoder for each segment of the plurality of segments.

14. The method of claim 13, further comprising:
  determining that a transport block size for the message satisfies a threshold size, wherein the plurality of segments is determined based at least in part on the transport block size for the message satisfying the threshold size.

15. The method of claim 13, wherein the communicating comprises:
  modulating the message in each segment of the plurality of segments using the determined respective neural network-based encoder for each segment of the plurality of segments; and
  transmitting the modulated message.

16. The method of claim 13, further comprising:
  determining, for each segment of the plurality of segments, a respective neural network-based decoder corresponding to the determined respective neural network-based encoder for each segment of the plurality of segments, wherein the communicating comprises:
  receiving the message; and
  demodulating the message in each segment of the plurality of segments using the determined respective neural network-based decoder for each segment of the plurality of segments.

17. The method of claim 13, wherein the plurality of segments is determined based at least in part on one or more resource elements of the set of resources, one or more physical resource blocks of the set of resources, one or more sub-bands of the set of resources, one or more orthogonal frequency domain multiplexing symbols of the set of resources, one or more orthogonal frequency domain multiplexing symbol groups of the set of resources, or a combination thereof.

18. The method of claim 13, wherein the respective size parameter for a segment of the plurality of segments corresponds to a number of resource elements for the segment, a number of physical resource blocks for the segment, a number of orthogonal frequency domain multiplexing symbols for the segment, a number of coded bits for the segment, or a combination thereof.

19. A user equipment (UE), comprising:
at least one processor;
at least one memory coupled with the at least one processor; and
instructions stored in the at least one memory and executable by the at least one processor to cause the UE to:
receive, from a network device, a grant indicating a size parameter for communicating a message;
determine, from a subset of a plurality of neural network-based encoders configured at the UE, a neural network-based encoder based at least in part on a neural network-based encoder index indicated by the grant, a transmission parameter, or both, the subset of the plurality of neural network-based encoders corresponding to the size parameter; and
communicate the message with the network device according to the grant and based at least in part on the determined neural network-based encoder.

20. The UE of claim 19, wherein the instructions to communicate are executable by the at least one processor to cause the UE to:
communicate the message in a non-coherent transmission, the non-coherent transmission comprising the message and no reference signals associated with the message for channel estimation.

21. The UE of claim 19, wherein the instructions are further executable by the at least one processor to cause the UE to:
determine the subset of the plurality of neural network-based encoders corresponding to the size parameter.

22. The UE of claim 19, wherein the instructions are further executable by the at least one processor to cause the UE to:
determine the subset of the plurality of neural network-based encoders corresponding to the size parameter.

23. The UE of claim 19, wherein the instructions are further executable by the at least one processor to cause the UE to:
receive, from the network device, a configuration message indicating the plurality of neural network-based encoders and one or more size parameters corresponding to each neural network-based encoder of the plurality of neural network-based encoders.

24. The UE of claim 19, wherein the UE is pre-configured with the plurality of neural network-based encoders and one or more size parameters corresponding to each neural network-based encoder of the plurality of neural network-based encoders.

25. The UE of claim 19, wherein the size parameter corresponds to a transport block size for the message, a number of resource elements for transmitting the message, a number of physical resource blocks for transmitting the message, a number of orthogonal frequency domain multiplexing symbols for transmitting the message, a number of coded bits for transmitting the message, or a combination thereof.

26. The UE of claim 19, wherein the instructions to communicate are executable by the at least one processor to cause the UE to:
modulate the message using the determined neural network-based encoder; and
transmit, to the network device, the modulated message.

27. The UE of claim 19, wherein the instructions are further executable by the at least one processor to cause the UE to:
determine a neural network-based decoder corresponding to the determined neural network-based encoder, wherein the instructions to communicate are executable by the at least one processor to cause the UE to:
receive, from the network device, the message; and
demodulate the message using the determined neural network-based decoder.

28. The UE of claim 19, wherein the grant comprises a dynamic uplink grant, a configured grant, a dynamic downlink grant, a semi-persistent scheduling configuration, or a combination thereof.

29. A network device, comprising:
at least one processor;
at least one memory coupled with the at least one processor; and
instructions stored in the at least one memory and executable by the at least one processor to cause the network device to:
transmit, for a user equipment (UE), a grant indicating a size parameter for communicating a message;
determine, from a subset of a plurality of neural network-based encoders configured for the UE, a neural network-based encoder based at least in part on a neural network-based encoder index indicated by the grant, a transmission parameter, or both, the subset of the plurality of neural network-based encoders corresponding to the size parameter; and
communicate the message for the UE according to the grant and based at least in part on the determined neural network-based encoder.

* * * * *